US010205518B1

(12) United States Patent
Xue et al.

(10) Patent No.: US 10,205,518 B1
(45) Date of Patent: Feb. 12, 2019

(54) METHOD AND SYSTEM FOR OPTICAL VECTOR ANALYSIS

(71) Applicant: Nanjing University of Aeronautics and Astronautics, Nanjing, Jiangsu (CN)

(72) Inventors: Min Xue, Jiangsu (CN); Shilong Pan, Jiangsu (CN); Ting Qing, Jiangsu (CN); Shupeng Li, Jiangsu (CN); Yuqing Heng, Jiangsu (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 0 days.

(21) Appl. No.: 15/854,712

(22) Filed: Dec. 26, 2017

(30) Foreign Application Priority Data

Jul. 19, 2017 (CN) .......................... 2017 1 0591672

(51) Int. Cl.
*H04B 10/07* (2013.01)
*H04B 10/40* (2013.01)
*H04B 10/50* (2013.01)
*H04B 10/60* (2013.01)
*H04B 10/077* (2013.01)

(52) U.S. Cl.
CPC ......... *H04B 10/0775* (2013.01); *H04B 10/07* (2013.01); *H04B 10/077* (2013.01); *H04B 10/0779* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| 2016/0065304 | A1* | 3/2016 | Hauske | H04B 10/0775 398/16 |
| 2016/0149637 | A1* | 5/2016 | Marsland, Jr. | H04B 10/63 398/25 |
| 2017/0302390 | A1* | 10/2017 | Entsfellner | H04B 3/46 |

OTHER PUBLICATIONS

Chao He, Shilong Pan, Ronghui Guo, Yongjiu Zhao, and Minghai Pan, "Ultrafast optical frequency comb generated based on cascaded polarization modulators," Optics Letters vol. 37, No. 18, pp. 3834-3836, published on Sep. 15, 2012.
Shilong Pan, and Min Xue, "Ultrahigh-resolution optical vector analysis based on optical single-sideband modulation," Journal of Lightwave Technology, vol. 35, No. 4, pp. 836-845, published on Feb. 15, 2017.

* cited by examiner

*Primary Examiner* — Darren E Wolf
(74) *Attorney, Agent, or Firm* — Rui Wu

(57) ABSTRACT

An apparatus comprises an optical detecting signal generator configured to provide an optical spectrum comprising two frequency carriers, the two frequency carriers having two different nominal carrier frequencies, and the output port of the optical detecting signal generator being further configured to be coupled to a device under test (DUT); an optical to electrical converter configured to generate a first electrical current based on the optical spectrum without the optical spectrum passing through the DUT; and generate a second electrical current based on the optical spectrum after the optical spectrum passes through the DUT; and a data processor coupled to the optical to electrical converter, the data processor being configured to determine a transfer function of the DUT at an average of the two different nominal carrier frequencies based on the first electrical current and the second electrical current.

20 Claims, 11 Drawing Sheets

METHOD AND SYSTEM FOR OPTICAL VECTOR ANALYSIS

CROSS-REFERENCE TO RELATED APPLICATIONS

This application claims priority to Chinese Patent Application No. 201710591672.8, filed on Jul. 19, 2017. The disclosure of the aforementioned application is hereby incorporated by reference in their entireties.

BACKGROUND

1. Technical Field

The present disclosure relates generally to a method and a system related to performing optical vector analysis. In particular, the present disclosure relates to a method and a system suitable for determining a transfer function of an optical device at various operating frequencies.

2. Discussion of Technical Background

Optical vector analysis may be performed to determine a transfer function of an optical device at various operating frequencies of the optical device. The transfer function of the optical device may also be referred to as a transmission response of the optical device, indicating a relationship, caused by the optical device, between an input signal received by the optical device and an output signal outputted by the optical device. The transfer function of the optical device may be further used to determine a plurality of characteristics of the optical device at the various operating frequencies. Examples of the characteristics may include, but not limited to, insertion loss, dispersion, group delay, polarization dependent loss, and polarization mode dispersion.

SUMMARY

In an exemplary embodiment, there is provided an apparatus comprising: an optical detecting signal generator configured to provide, through an output port of the optical detecting signal generator, an optical spectrum comprising two frequency carriers, the two frequency carriers having two different nominal carrier frequencies, and the output port of the optical detecting signal generator being further configured to be coupled to a device under test (DUT); an optical to electrical converter configured to: generate a first electrical current based on the optical spectrum without the optical spectrum passing through the DUT; and generate a second electrical current based on the optical spectrum after the optical spectrum passes through the DUT; and a data processor coupled to the optical to electrical converter, the data processor being configured to determine a transfer function of the DUT at an average of the two different nominal carrier frequencies based on the first electrical current and the second electrical current.

In another exemplary embodiment, there is provided a method comprising: providing an optical spectrum comprising two frequency carriers, the two frequency carriers having two different nominal carrier frequencies; generating a first electrical current based on the optical spectrum without the optical spectrum passing through a DUT; generating a second electrical current based on the optical spectrum after the optical spectrum passes through the DUT; and determining, by a data processor, a transfer function of the DUT at an average of the two different nominal carrier frequencies based on the first electrical current and the second electrical current.

In yet another exemplary embodiment, there is provided an apparatus comprising: an optical multiple-carrier generator configured to provide, through an output port of the optical multiple-carrier generator, an optical spectrum having a plurality of optical frequency carriers, wherein the output port of the optical multiple-carrier generator is further configured to be coupled to a DUT; a splitter configured to: receive, through an input port of the splitter, the optical spectrum; and provide each of a plurality of portions of the optical spectrum to a respective one of a plurality of channels; the plurality of channels coupled to the splitter, wherein each of the plurality of channels comprises an optical to electrical converter, the optical to electrical converter being configured to: receive a respective portion of the optical spectrum, the respective portion of the optical spectrum comprising two frequency carriers, and the two frequency carriers having two different nominal carrier frequencies; generate a first electrical current based on the respective portion of the optical spectrum without the optical spectrum passing through the DUT; and generate a second electrical current based on the respective portion of the optical spectrum after the optical spectrum passes through the DUT; and a data processor coupled to the plurality of channels, wherein the data processor is configured to determine, with respect to each of the plurality of channels, a transfer function of the DUT at an average of the two different nominal carrier frequencies based on the first electrical current and the second electrical current.

Other concepts relate to software for performing the optical vector analysis as described herein. A software product, in accord with this concept, includes at least one machine-readable non-transitory medium and information carried by the medium.

In an exemplary embodiment, there is provided a machine-readable tangible and non-transitory medium having information, wherein the information, when read by a hardware processor system, causes the hardware processor system to perform following: providing an optical spectrum comprising two frequency carriers, the two frequency carriers having two different nominal carrier frequencies; generating a first electrical current based on the optical spectrum without the optical spectrum passing through a DUT; generating a second electrical current based on the optical spectrum after the optical spectrum passes through the DUT; and determining, by a data processor, a transfer function of the DUT at an average of the two different nominal carrier frequencies based on the first electrical current and the second electrical current.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Reference will now be made in detail to the embodiments of the present disclosure, examples of which are illustrated in the accompanying drawings. While the present disclosure will be described in conjunction with the embodiments, it will be understood that they are not intended to limit the present disclosure to these embodiments. On the contrary, the present disclosure is intended to cover alternatives, modifications, and equivalents, which may be included within the spirit and scope of the present disclosure as defined by the appended claims.

In addition, in the following detailed description of embodiments of the present disclosure, numerous specific details are set forth in order to provide a thorough understanding of the present disclosure. However, it will be recognized by one of ordinary skill in the art that the present disclosure may be practiced without these specific details. In other instances, well-known methods, procedures, components, and circuits have not been described in detail as not to unnecessarily obscure aspects of the embodiments of the present disclosure.

Figure 1:
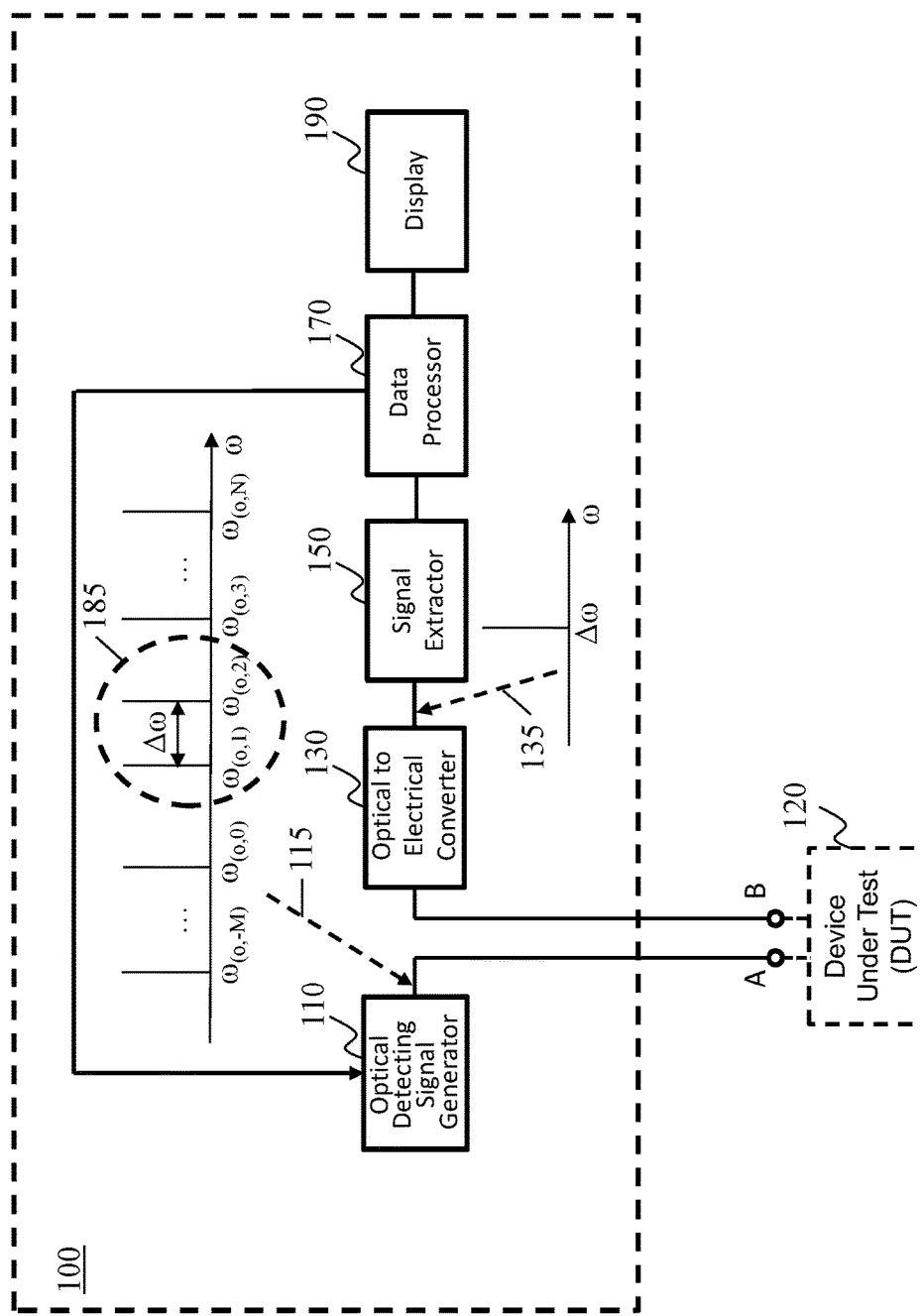
FIG. 1 is a schematic diagram of an optical vector analyzer suitable for performing optical vector analysis on a device under test (DUT) according to an embodiment of the present disclosure.

Referring to FIG. 1, a schematic diagram of an optical vector analyzer 100 is shown according to an embodiment of the disclosure. The optical vector analyzer 100 may be used to perform an optical vector analysis on a device under test (DUT) 120. In particular, the optical vector analyzer 100 may be used to determine a transfer function of the DUT 120 at various operating frequencies. As shown, the optical vector analyzer 100 may comprise an optical detecting signal generator 110, an optical to electrical converter 130, a signal extractor 150, a data processor 170, and a display 190. The various components may be arranged as shown or in any other suitable manner.

The optical detecting signal generator 110 may be configured to provide an optical spectrum comprising at least two frequency carriers. In an embodiment, the at least two frequency carriers are at least two optical frequency carriers. Each frequency carrier is an electromagnetic radiation having a single nominal carrier frequency or a narrow frequency range around a nominal carrier frequency. The nominal carrier frequency of a frequency carrier may be a frequency corresponding to a peak power of the frequency carrier.

An exemplary optical spectrum provided by the optical detecting signal generator 110 is shown in FIG. 1 as directed by arrow 115. In an embodiment, the optical spectrum, as in a dashed circle 185 in FIG. 1, includes a first frequency carrier having a first nominal carrier frequency, denoted by $\omega_{(o,\ 1)}$, and a second optical frequency carrier having a second nominal carrier frequency, denoted by $\omega_{(o,\ 2)}$. The spacing between the first optical frequency carrier and the second optical frequency carrier may be denoted by $\Delta\omega$. In an embodiment, the optical spectrum includes, in addition to the first optical frequency carrier and the second optical frequency carrier, one or more additional optical frequency carriers, each of which has a different nominal carrier frequency, denoted by $\omega_{(o,\ -M)}, \ldots \omega_{(o,\ 0)}, \omega_{(o,\ 3)}, \ldots$, and $\omega_{(o,\ N)}$, where M and N are integers. Particularly, the spacing between adjacent optical frequency carriers in the whole optical spectrum, as directed by arrow 115 in FIG. 1, except the spacing between the first optical frequency carrier and the second optical frequency carrier in the dashed circle 185, is greater than $\Delta\omega$. This also means, any pair of optical frequency carriers in the whole optical spectrum as directed by arrow 115 in FIG. 1, except the first optical frequency carrier and the second optical frequency carrier in the dashed circle 185, has a difference in frequency which is greater than $\Delta\omega$.

The first carrier frequency, $\omega_{(o,\ 1)}$, and/or the second carrier frequency, $\omega_{(o,\ 2)}$, may be tunable. In addition or alternatively, the spacing between the first frequency carrier and the second frequency carrier, i.e., $\Delta\omega$ is tunable. In an embodiment, the optical detecting signal generator 110 has an input port coupled to the data processor 170, which may be used to adjust the first carrier frequency, $\omega_{(o,\ 1)}$, the second carrier frequency, $\omega_{(o,\ 2)}$, and/or the difference between the first carrier frequency and the second carrier frequency, $\Delta\omega$. In some embodiments, one or more nominal carrier frequencies, e.g., $\omega_{(o,\ -M)}, \ldots, \omega_{(o,\ 0)}, \omega_{(o,\ 3)}, \ldots$, and $\omega_{(o,\ N)}$, corresponding to the one or more additional frequency carriers in the optical spectrum may be, individually or collectively, tuned by the data processor 170. Further, the optical detecting signal generator 110 has an output port, denoted by port A as shown in FIG. 1, configured to output the optical spectrum. In operation, the output port of the optical detecting signal generator 110, i.e., port A, may be coupled to the DUT 120. Alternatively, the output port of the optical detecting signal generator 110, i.e., port A, may be coupled to the optical to electrical converter 130 through an input port of the optical to electrical converter 130, denoted by port B. More details will be discussed further below.

The optical to electrical converter 130 may be configured to convert the optical spectrum to an electrical current. The input port of the optical to electrical converter 130, i.e., port B, may be configured to receive the optical spectrum, as an output port of the optical to electrical converter 130 may be configured to output the electrical current. The optical to electrical converter 130 may be configured so that each of the frequency carriers in the optical spectrum, i.e., $\omega_{(o,\ -M)}, \ldots, \omega_{(o,\ 0)}, \omega_{(o,\ 1)}, \omega_{(o,\ 2)}, \omega_{(o,\ 3)}, \ldots$, and $\omega_{(o,\ N)}$, in addition to any difference in frequency between any pair of frequency carriers from the optical spectrum except the first frequency carrier and the second frequency carrier, falls out of the operating frequency range of the optical to electrical converter 130. As a result, the electrical current includes a single frequency carrier having a nominal carrier frequency at $\Delta\omega$, as shown in FIG. 1 and directed by arrow 135. In an embodiment, the optical to electrical converter 130 operates only at frequency $\Delta\omega$. In an embodiment, the optical to electrical converter 130 operates at a narrow frequency range around $\Delta\omega$. In an embodiment, the optical to electrical converter 130 operates at a frequency range between zero and $\Delta\omega$. In an embodiment, the input port of the optical to electrical converter 130, i.e., port B, may be coupled to the output port of the optical detecting signal generator 110, i.e., port A, directly. Accordingly, the electrical current is converted, by the optical to electrical converter 130, from the optical spectrum provided by the optical detecting signal generator 110 directly, i.e., without the optical spectrum passing through the DUT 120. In an embodiment, the input port of the optical to electrical converter 130, i.e., port B, may be coupled to the output port of the DUT 120, as the output port of the optical detecting signal generator 110, i.e., port A, may be coupled to the input port of the DUT 120. Accordingly, the electrical current is converted, by the optical to electrical converter 130, from the optical spectrum provided by the optical detecting signal generator 110 after the optical spectrum passes through the DUT 120.

The signal extractor 150 may have an input port coupled to the output port of the optical to electrical converter 130 and configured to receive the electrical current. The signal extractor 150 may be configured to measure the electrical current. In particular, the signal extractor 150 may be configured to measure the electrical current by determining amplitude and phase of the electrical current, respectively, at one or more frequencies including $\Delta\omega$. The signal extractor 150 may further have an output port coupled to an input port of the data processor 170 and configured to output the measurement results (i.e., the amplitude and the phase of the electrical current) to the data processor 170.

The data processor 170 may have the input port coupled to the output port of the signal extractor 150 and configured to receive the measurement results from the signal extractor 150. The data processor 170 may be configured to determine the transfer function of the DUT 120 at various operating frequencies based on the measurement results received from the signal extractor 150. The transfer function of the DUT 120 may also be referred to as a transmission response of the DUT 120. In an embodiment, the transfer function of the DUT 120 may be indicative of a relationship, caused by the DUT 120, between an input signal received by the DUT 120 and a corresponding output signal outputted by the DUT 120. The transfer function of the DUT 120 may further be used to determine a plurality of characteristics of the DUT 120 at the various operating frequencies. Examples of the characteristics may include, but not limited to, insertion loss, dispersion, group delay, polarization dependent loss, and polarization mode dispersion.

Further, the data processor 170, as described above, may be coupled to the optical detecting signal generator 110. The data processor 170 may be configured to adjust the first carrier frequency, $\omega_{(o,\,1)}$, the second carrier frequency, $\omega_{(o,\,2)}$, and/or the difference between the first carrier frequency and the second carrier frequency, $\Delta\omega$. Optionally, the data processor 170 may be further configured to tune, individually or collectively, one or more nominal carrier frequencies, e.g., $\omega_{(o,\,-M)}, \ldots, \omega_{(o,\,0)}, \omega_{(o,\,3)}, \ldots,$ and $\omega_{(o,\,N)}$, corresponding to the one or more additional frequency carriers in the optical spectrum as described above.

The display 190 may have an input port coupled to the output port of the data processor 170 and configured to display the transfer function of the DUT 120, e.g., in forms of showing both amplitude and phase of the transfer function of the DUT 120 and/or the plurality of characteristics of the DUT 120 at various operating frequencies received from and determined by the data processor 170.

In an embodiment, a device characterization process and a system calibration process may be implemented respectively in order to perform the optical vector analysis on the DUT 120. The order of performing the device characterization process and the system calibration process may be interchangeable.

When the optical spectrum provided by the optical detecting signal generator 110 includes only the first frequency carrier and the second frequency carrier, the electrical field of the optical spectrum may be expressed by:

$$E_c(t) = A_1 \exp(j\omega_{(o,1)}t) + A_2 \exp(j\omega_{(o,2)}t) \qquad (1)$$

where $E_c(t)$ represents the electrical field of the optical spectrum provided by the optical detecting signal generator 110, $A_1$ represents an amplitude of the electrical field of the first frequency carrier, and $A_2$ represents an amplitude of the electrical field of the second frequency carrier.

Alternatively, when the optical spectrum provided by the optical detecting signal generator 110 includes one or more additional frequency carriers in addition to the first frequency carrier and the second frequency carrier, the electrical field of the optical spectrum may be expressed by:

$$E_c(t) = A_{-M} \exp(j\omega_{(o,-M)}t) + A_{-M+1} \exp(j\omega_{(o,-M+1)}t) + \ldots + A_N \exp(j\omega_{(o,N)}t) \qquad (2)$$

where $E_c(t)$ represents the electrical field of the optical spectrum provided by the optical detecting signal generator 110, $A_{-M}, \ldots, A_N$ represent amplitudes of the electrical fields of the corresponding frequency carriers in the optical spectrum, respectively. However, it should be noted that any pair of the nominal carrier frequencies, except $\omega_{(o,\,1)}$ and $\omega_{(o,\,2)}$, selected from $\omega_{(o,\,-M)}, \omega_{(o,\,-M+1)}, \ldots, \omega_{(o,\,N)}$, has a difference greater than $|\omega_{(o,\,1)} - \omega_{(o,\,2)}|$ or $\Delta\omega$. This is done so that the electrical current converted by the optical to electrical converter 130 from the optical spectrum includes a single nominal carrier frequency at $\Delta\omega$.

When performing the system calibration process, the output port of the optical detecting signal generator, i.e., port A, is coupled to the input port of the optical to electrical converter 130, i.e., port B, directly. As a result, the optical to electrical converter 130 may convert the optical spectrum, whose electrical field is expressed by either equation (1) or equation (2), to a first electrical current, which may be subsequently measured by the signal extractor 150 through determining the amplitude and the phase of the first electrical current, and finally obtained by the data processor 170. Accordingly, the first electrical current may be expressed by:

$$i_{SYS}(\Delta\omega) = A_2 A_1^* H_{SYS}(\omega_{(o,2)}) H^*_{SYS}(\omega_{(o,1)}) \qquad (3)$$

where $i_{SYS}(\Delta\omega)$ is the first electrical current including the single nominal carrier frequency of $\Delta\omega$, $A_1^*$ is complex conjugate of the amplitude of the electrical field of the first frequency carrier, $H_{SYS}(\omega_{(o,2)})$ is the transfer function of the system (i.e., the optical vector analyzer 100) at the frequency of $\omega(o,2)$, and $H^*_{SYS}(\omega_{(o,1)})$ is complex conjugate of the transfer function of the system at the frequency of $\omega(o,1)$.

When performing the device characterization process, the output port of the optical detecting signal generator 110, i.e., port A, is coupled to the input port of the DUT 120, as the input port of the optical to electrical converter 130, i.e., port B, is coupled to the output port of the DUT 120. As a result, the optical to electrical converter 130 may convert the optical spectrum, after the optical spectrum passing through the DUT 120, to a second electrical current, which may be subsequently measured by the signal extractor 150 through determining the amplitude and the phase of the second electrical current, and finally obtained by the data processor 170.

Accordingly, when the optical spectrum provided by the optical detecting signal generator 110 includes only the first frequency carrier and the second frequency carrier, the electrical field of the optical spectrum after passing through the DUT 120 may be expressed by:

$$E_{DUT}(t) = A_1 H(\omega_{(o,1)}) \exp(j\omega_{(o,1)}t) + A_2 H(\omega_{(o,2)}) \exp(j\omega_{(o,2)}t) \qquad (4)$$

where $E_{DUT}(t)$ represents the electrical field of the optical spectrum after passing through the DUT 120, $H(\omega_{(o,\ 1)})$ is the transfer function resulting from both the DUT 120 and the system at the frequency of $\omega_{(o,\ 1)}$, and $H(\omega_{(o,\ 2)})$ is the transfer function resulting from both the DUT 120 and the system at the frequency of $\omega_{(o,\ 2)}$.

Alternatively, when the optical spectrum provided by the optical detecting signal generator 110 includes the one or more additional frequency carriers in addition to the first frequency carrier and the second frequency carrier, the electrical field of the optical spectrum after passing through the DUT 120 may be expressed by:

$$E_{DUT}(t) = A_{-M} H(\omega_{(o,-M)}) \exp(j\omega_{(o,-M)} t) + \ldots + A_N H(\omega_{(o,N)}) \exp(j\omega_{(o,N)} t) \quad (5)$$

where $H(\omega_{(o,\ -M)}), \ldots, H(\omega_{(o,\ N)})$ represent the transfer function resulting from both the DUT 120 and the system at the frequencies of $\omega_{(o,\ -M)}, \ldots, \omega_{(o,\ N)}$, respectively.

Further, the second electrical current may be expressed by:

$$i(\Delta\omega) = A_2 A^*_1 H(\omega_{(o,2)}) H^*(\omega_{(o,1)}) \quad (6)$$

where $i(\Delta\omega)$ is the second electrical current including the single nominal carrier frequency of $\Delta\omega$, $H(\omega_{(o,2)})$ is the transfer function resulting from both the DUT 120 and the system at the frequency of $\omega(o,2)$, and $H^*(\omega_{(o,1)})$ is complex conjugate of the transfer function resulting from both the DUT 120 and the system at the frequency of $\omega(o,1)$.

The relationship between $H(\omega_{(o,2)})$ and $H_{SYS}(\omega_{(o,2)})$ may be expressed by:

$$H(\omega_{(o,2)}) = H_{SYS}(\omega_{(o,2)}) H_{DUT}(\omega_{(o,2)}) \quad (7)$$

where $H_{DUT}(\omega_{(o,2)})$ represents the transfer function of the DUT 120 at the frequency of $\omega_{(o,2)}$.

In addition, the relationship between $H^*(\omega_{(o,1)})$ and $H^*_{SYS}(\omega_{(o,1)})$ may be expressed by:

$$H^*(\omega_{(o,1)}) = H^*_{SYS}(\omega_{(o,1)}) H^*_{DUT}(\omega_{(o,1)}) \quad (8)$$

where $H^*_{DUT}(\omega_{(o,1)})$ represents the complex conjugate of the transfer function of the DUT 120 at the frequency $\omega_{(o,1)}$.

Upon completion of the system calibration process and the device characterization process, the data processor may be further configured to make the following determination based on equations (3), (6), (7), and (8):

$$\frac{i(\Delta\omega)}{i_{SYS}(\Delta\omega)} = H_{DUT}(\omega_{(o,2)}) H^*_{DUT}(\omega_{(o,1)}) \quad (9)$$

Assuming $\Delta\omega$ is very small, $H(\omega_{(o,2)})$ and $H^*_{DUT}(\omega_{(o,1)})$ can be approximated by $$H_{DUT}\left(\frac{\omega_{(o,1)} + \omega_{(o,2)}}{2}\right) \text{ and } H^*_{DUT}\left(\frac{\omega_{(o,1)} + \omega_{(o,2)}}{2}\right),$$

respectively. Accordingly, the data processor 170 may be further configured to make the following determination based on equations (9):

$$\left|H_{DUT}\left(\frac{\omega_{(o,1)} + \omega_{(o,2)}}{2}\right)\right| = \frac{\sqrt{|i(\Delta\omega)|}}{\sqrt{|i_{SYS}(\Delta\omega)|}} \quad (10)$$

$$D\left(\frac{\omega_{(o,1)} + \omega_{(o,2)}}{2}\right) = \frac{\exp[j\phi(i(\Delta\omega)) - j\phi(i_{SYS}(\Delta\omega))]}{\Delta\omega} \quad (11)$$

where $$H_{DUT}\left(\frac{\omega_{(o,1)} + \omega_{(o,2)}}{2}\right)$$

is the transfer function of the DUT 120 at the average of the first nominal carrier frequency and the second nominal carrier frequency, $$\left|H_{DUT}\left(\frac{\omega_{(o,1)} + \omega_{(o,2)}}{2}\right)\right|$$

is amplitude of the transfer function of the DUT 120 at the average of the first nominal carrier frequency and the second nominal carrier frequency, $|i_{SYS}(\Delta\omega)|$ is the amplitude of the first current, which can be measured by the signal extractor 150 and obtained by the data processor 170, $|i(\Delta\omega)|$ is the amplitude of the second current, which can be measured by the signal extractor 150 and obtained by the data processor 170, $$D\left(\frac{\omega_{(o,1)} + \omega_{(o,2)}}{2}\right)$$

is the group delay of the DUT 120 at the average of the first nominal carrier frequency and the second nominal carrier frequency, $\phi[i_{SYS}(\Delta\omega)]$ is the phase of the first current, which can be measured by the signal extractor 150 and obtained by the data processor 170, and $\phi[i(\Delta\omega)]$ is the phase of the second current, which can be measured by the signal extractor 150 and obtained by the data processor 170. The phase of the transfer function of the DUT 120 at the average of the first nominal carrier frequency and the second nominal carrier frequency may be further determined by integrating $$D\left(\frac{\omega_{(o,1)} + \omega_{(o,2)}}{2}\right)$$

with respect to frequency.

In an embodiment, the first nominal carrier frequency $\omega_{(o,1)}$, the second nominal carrier frequency, $\omega_{(o,2)}$, and/or the difference between the first nominal carrier frequency and the second nominal carrier frequency, i.e., $\Delta\omega$, may be adjusted, for example, by the data processor 170. This is done so that the transfer function of the DUT 120 at various other operating frequencies may be determined accordingly by performing one or more additional sets of the device characterization process and the system calibration process as described above. In an embodiment, the first nominal carrier frequency, $\omega_{(o,1)}$, the second nominal carrier frequency, $\omega_{(o,2)}$ may be adjusted by an equal amount while keeping the difference of the first nominal carrier frequency and the second nominal carrier frequency, i.e., $\Delta\omega$, the same. In an embodiment, the equal amount may be greater than or equal to $\Delta\omega$. As a result, the nominal carrier frequency of both the first electrical current and the second electrical current converted by the optical to electrical converter 130 would never be changed, which reduces the frequency-dependent measurement errors for the optical to electrical converter 130 and the signal extractor 150 and thereby improves the accuracy and stability of performance of the optical vector analyzer 100.

Figure 2:
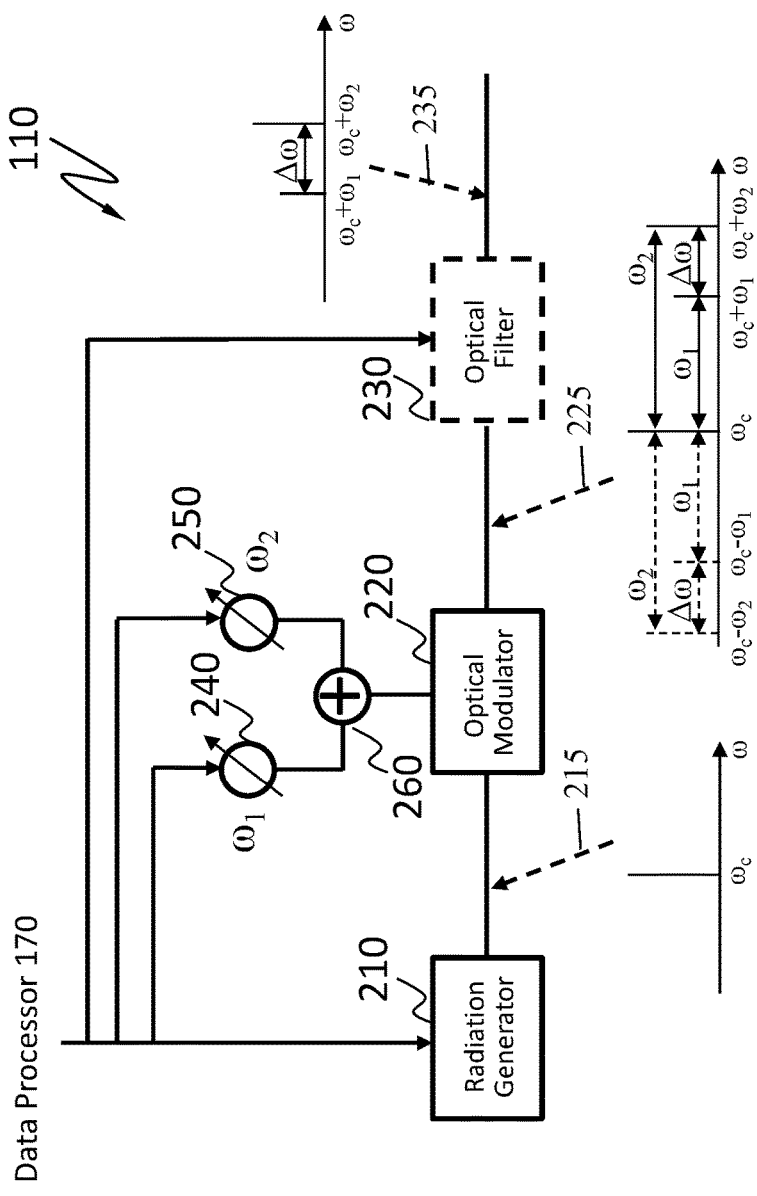
FIG. 2 is a schematic diagram of an embodiment of an optical detecting signal generator.

Referring to FIG. 2, a schematic diagram of an embodiment of the optical detecting signal generator 110 is depicted. As shown, the optical detecting signal generator 110 includes a radiation generator 210, an optical modulator 220, a first tunable radio-frequency (RF) signal generator 240, a second tunable RF signal generator 250, and an RF combiner 260. In an embodiment, the optical detecting signal generator 110 may, optionally, further include an optical filter 230.

The radiation generator 210 may be configured to provide an electromagnetic radiation having a nominal carrier frequency, $\omega_c$. An exemplary spectral profile of the electromagnetic radiation provided by the radiation generator 210 is shown in FIG. 2 as directed by arrow 215. The nominal carrier frequency of the electromagnetic radiation, i.e., $\omega_c$, may be tunable. As shown, the radiation generator 210 has an input port coupled to the data processor 170 and configured to receive a control signal from the data processor 170, which may be used to tune the nominal carrier frequency of the electromagnetic radiation, i.e., $\omega_c$. The radiation generator 210 further includes an output port coupled to the optical modulator 220 and configured to output the electromagnetic radiation to the optical modulator 220.

The optical modulator 220 may include a first input port coupled to the radiation generator 210 and configured to receive the electromagnetic radiation from the radiation generator 210. The optical modulator 220 may include a second input port configured to receive a first RF signal having a first RF frequency, $\omega_1$, and a second RF signal having a second RF frequency, $\omega_2$. The optical modulator 220 may be configured to generate a modulated optical spectrum by modulating the first RF frequency and the second RF frequency on the electromagnetic radiation received from the radiation generator. An example spectral profile of the modulated optical spectrum is shown in FIG. 2 as directed by arrow 225.

In an embodiment, the optical modulator 220 is a single sideband modulator, which generates a sideband on one side of the nominal carrier frequency, $\omega_c$, with respect to each of the first RF frequency, $\omega_1$, and a second RF frequency, $\omega_2$. As a result, the modulated optical spectrum is shown in solid lines in the spectral profile directed by arrow 225, which includes the nominal carrier frequency of $\omega_c$, a first sideband frequency of $\omega_c+\omega_1$, and a second sideband frequency of $\omega_c+\omega_2$. The difference between the first sideband frequency and the second sideband frequency, i.e., $\Delta\omega=\omega_2-\omega_1$ is smaller than both the first RF frequency, $\omega_1$, and the second RF frequency, $\omega_2$. Subsequently, the modulated optical spectrum, e.g., in solid line, may be outputted directly through the output port of the optical detecting signal generator 110, i.e., port A in FIG. 1. Alternatively, the modulated optical spectrum, e.g., in solid line, may subsequently pass through the optical filter 230 before outputted through the output port of the optical detecting signal generator 110, i.e., port A in FIG. 1. In an embodiment, the output port of the optical modulator 220, when the optical filter 230 is not included in the optical vector analyzer 100, is the output port of the optical vector analyzer 100, i.e., port A.

In an embodiment, the optical modulator 220 is a double sideband modulator, which generates a sideband on each side of the nominal carrier frequency, $\omega_c$, with respect to each of the first RF frequency, $\omega_1$, and a second RF frequency, $\omega_2$. As a result, the modulated optical spectrum is shown in both solid lines and dashed lines in the spectral profile directed by arrow 225, which includes the nominal carrier frequency of $\omega_c$, the first sideband frequency of $\omega_c+\omega_1$, the second sideband frequency of $\omega_c+\omega_2$, a third sideband frequency of $\omega_c-\omega_1$, and a fourth sideband frequency of $\omega_c-\omega_2$. The difference between the first sideband frequency and the second sideband frequency, or between the third sideband frequency and the fourth sideband frequency, i.e., $\Delta\omega=\omega_2-\omega_1$ is smaller than both the first RF frequency, $\omega_1$, and the second RF frequency, $\omega_2$. Subsequently, the modulated optical spectrum, e.g., in both the solid line and the dashed line, may be pass through the optical filter 230 before outputted through the output port of the optical detecting signal generator 110, i.e., port A in FIG. 1.

As shown in FIG. 2, the first RF signal having the first RF frequency, $\omega_1$, and the second RF signal having the second RF frequency, $\omega_2$ may be provided to the second input port of the optical modulator 220 through the use of the first tunable RF signal generator 240, the second tunable RF signal generator 250, and the RF combiner 260. The first tunable RF signal generator 240 may be configured to provide a first sinusoidal signal at the first RF frequency of $\omega_1$. The second tunable RF signal generator 250 may be configured to provide a second sinusoidal signal at the second RF frequency of $\omega_2$. The RF combiner 260 may be configured to receive both the first sinusoidal signal from the first tunable RF signal generator 240 and the second sinusoidal signal from the second tunable RF signal generator 250. The RF combiner 260 may be further configured to provide both the first sinusoidal signal having the first RF frequency of $\omega_1$ and the second sinusoidal signal having the second RF frequency of $\omega_2$ to the optical modulator 220. In an embodiment, the first RF signal is the first sinusoidal signal, as the second RF signal is the second sinusoidal signal. The first tunable RF signal generator 240 and the second tunable RF signal generator 250 may be coupled to the data processor 170, which may be used to tune the first RF frequency of $\omega_1$, the second RF frequency of $\omega_2$, or both.

The optical filter 230 may include an input port configured to receive the modulated optical spectrum. The optical filter 230 may be configured to provide a filtered optical spectrum based on the modulated optical spectrum. The optical filter 230 may be a bandpass filter or a band-stop filter. In an embodiment, the filtered optical spectrum may include the first sideband frequency of $\omega_c+\omega_1$ and the second sideband frequency of $\omega_c+\omega_2$, as shown in an example spectral profile as directly by arrow 235. Optionally, the filtered optical spectrum may further include the nominal carrier frequency of $\omega_c$ and/or only one of the third sideband frequency of $\omega_c-\omega_1$ and the fourth sideband frequency of $\omega_c-\omega_2$. In an embodiment, the filtered optical spectrum may include the third sideband frequency of $\omega_c-\omega_1$ and the fourth sideband frequency of $\omega_c-\omega_2$. Optionally, the filtered optical spectrum may further include the nominal carrier frequency of $\omega_c$ and/or only one of the first sideband frequency of $\omega_c+\omega_1$ and the second sideband frequency of $\omega_c+\omega_2$. The optical filter 230 may further include an output port configured to output the filtered optical spectrum. In an embodiment, the optical port of the optical filter 230 may be the output port of the optical vector analyzer 100, i.e., port A, in FIG. 1.

Figure 3:
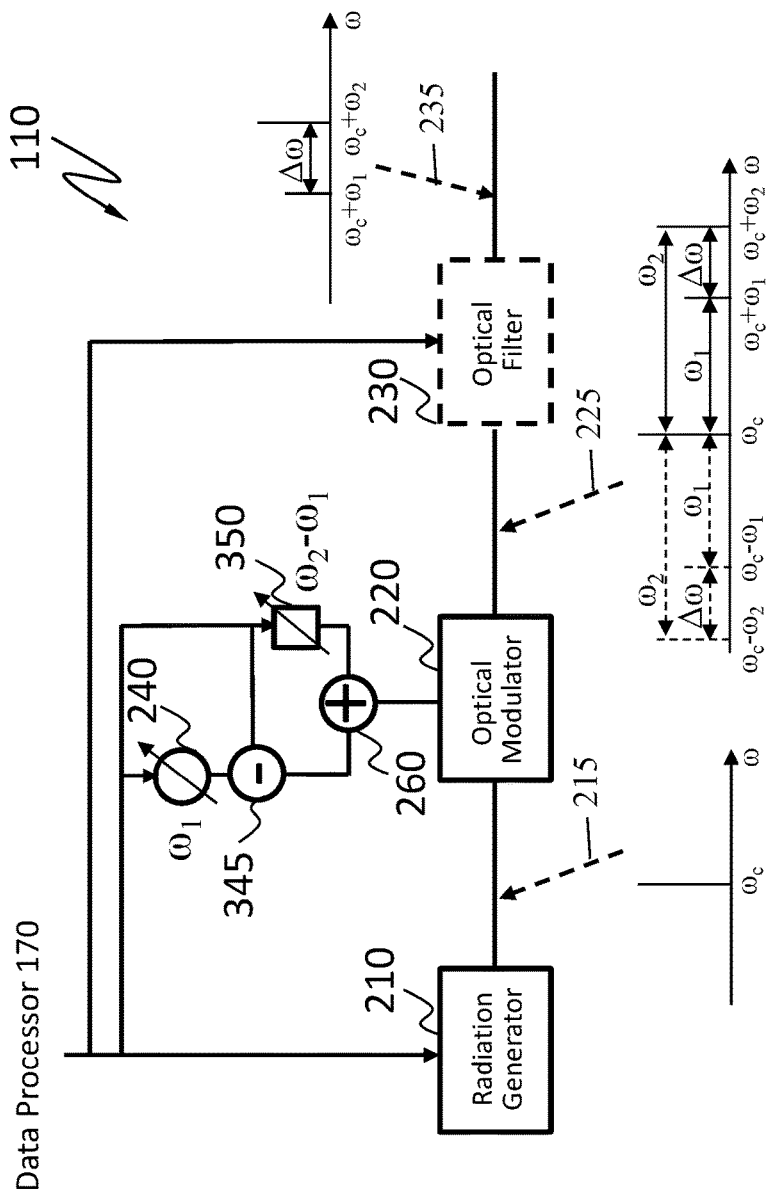
FIG. 3 is a schematic diagram of another embodiment of the optical detecting signal generator.

Referring to FIG. 3, a schematic diagram of another embodiment of the optical detecting signal generator 110 is depicted. Different than that in FIG. 2, the first RF signal having the first RF frequency, $\omega_1$, and the second RF signal having the second RF frequency, $\omega_2$ may be provided to the second input port of the optical modulator 220 through the use of the first tunable RF signal generator 240, an RF splitter 345, an RF frequency shifter 350, and the RF combiner 260. As described above, the first tunable RF signal generator 240 may be configured to provide the first sinusoidal signal at the first RF frequency of $\omega_1$. The RF splitter 345 may be configured to split the first sinusoidal signal in half. The RF splitter 345 may be further configured to provide a half of the first sinusoidal signal to a first input port of the RF combiner 260. In addition, the RF splitter 345 may be configured to provide the other half of the first sinusoidal signal to an input port of the RF frequency shifter 350. The RF frequency shifter 350 may be configured to shift the RF frequency of the first sinusoidal signal by an amount equal to $\Delta\omega=\omega_2-\omega_1$, producing the second sinusoidal signal having the second RF frequency of $\omega_2$. The RF frequency shifter 350 may be finally configured to output the second sinusoidal signal to a second input port of the RF combiner 260. The RF combiner 260 may be configured to receive the first sinusoidal signal having the first RF frequency of $\omega_1$ and the second sinusoidal signal having the second RF frequency of $\omega_2$. The RF combiner 260 may be further configured to output both the first sinusoidal signal and the second sinusoidal signal to the optical modulator 220.

In an embodiment, as shown in FIG. 3, the first tunable RF signal generator 240 and the RF frequency shifter 350 may be coupled to the data processor 170, which may be used to tune the first RF frequency of $\omega_1$, the frequency shift ($\Delta\omega=\omega_2-\omega_1$), or both.

Figure 4:
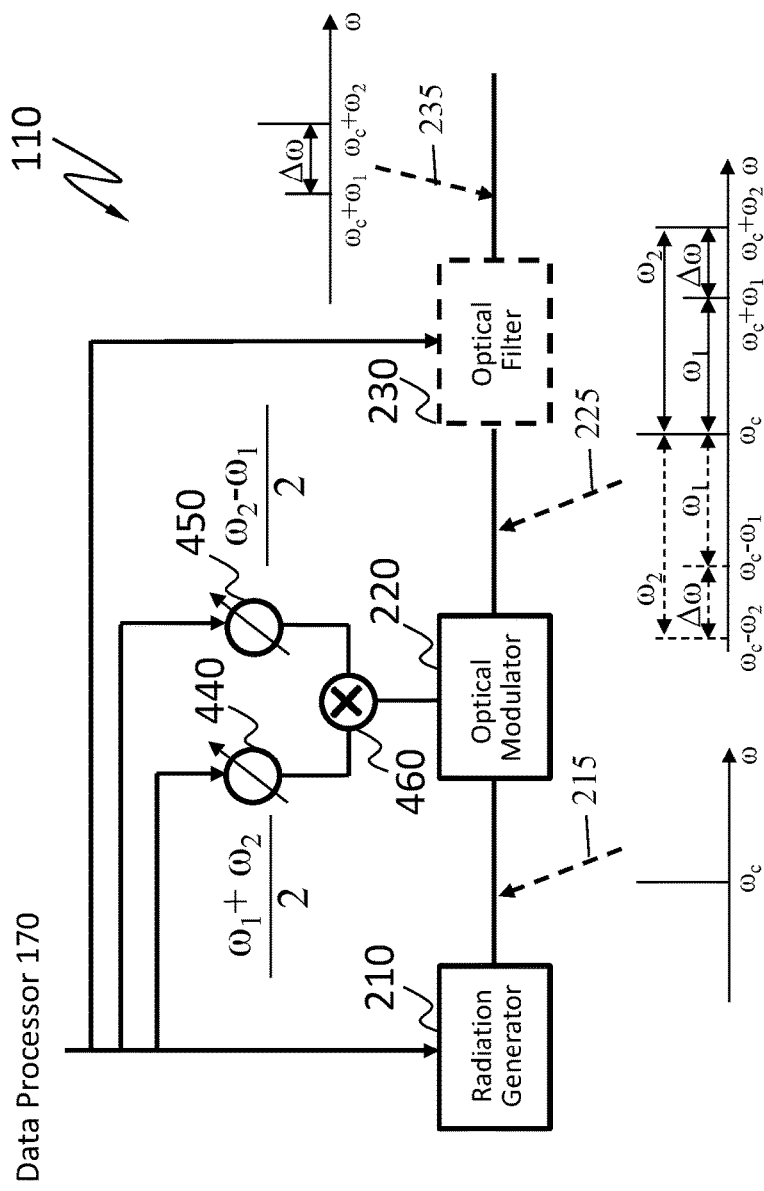
FIG. 4 is a schematic diagram of yet another embodiment of the optical detecting signal generator.

Referring to FIG. 4, a schematic diagram of yet another embodiment of the optical detecting signal generator 110 is depicted. Different than those in FIG. 2 and FIG. 3, the first RF signal having the first RF frequency, $\omega_1$, and the second RF signal having the second RF frequency, $\omega_2$ may be provided to the second input port of the optical modulator 220 through the use of a third tunable RF signal generator 440, a fourth tunable RF signal generator 450, and a frequency mixer 460. The third tunable RF signal generator 440 may be configured to provide a third sinusoidal signal at a third RF frequency of $$\frac{\omega_1+\omega_2}{2}.$$

The fourth tunable RF signal generator 450 may be configured to provide a fourth sinusoidal signal at a fourth RF frequency of $$\frac{\omega_2-\omega_1}{2},$$

assuming $\omega_2>\omega_1$. The frequency mixer 460 may be configured to receive both the third sinusoidal signal from the third tunable RF signal generator 440 and the fourth sinusoidal signal from the fourth tunable RF signal generator 450. The frequency mixer 460 may be further configured to generate the first RF signal having the first RF frequency of $\omega_1$ by combining the third sinusoidal signal and the fourth sinusoidal signal. The frequency mixer 460 may be further configured to generate the second RF signal by subtracting the fourth sinusoidal signal from the third sinusoidal signal. The frequency mixer 460 may be finally configured to provide the first RF signal having the first RF frequency of $\omega_1$ and the second RF signal having the second RF frequency of $\omega_2$ to the second input port of the optical modulator 220. The third tunable RF signal generator 440 and the fourth tunable RF signal generator 450 may be coupled to the data processor 170, which may be used to tune the third RF frequency of $$\frac{\omega_1+\omega_2}{2},$$

the fourth RF frequency of $$\frac{\omega_2-\omega_1}{2},$$

or both, resulting in adjustment in the first RF frequency of $\omega_1$ and the second RF frequency of $\omega_2$.

Figure 5:
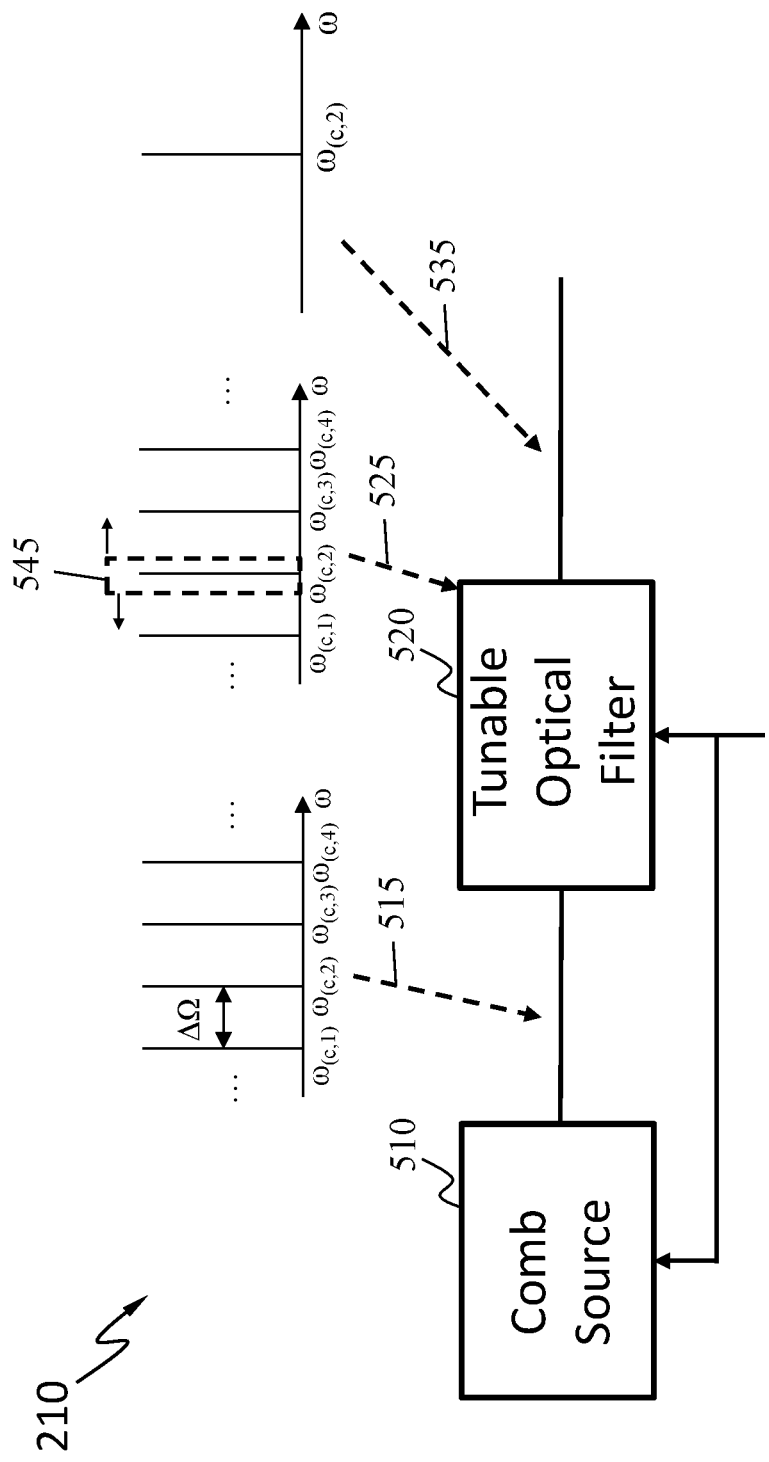
FIG. 5 is a schematic diagram of a radiation generator according to an embodiment of the present disclosure.

Referring to FIG. 5, a schematic diagram of the radiation generator 210 is shown according to an embodiment of the present disclosure. The radiation generator 210 may include a comb source 510 and a tunable optical filter 520 coupled to the comb source 510.

The comb source 510 may be configured to provide an optical frequency comb comprising a plurality of equally spaced optical frequency carriers. In some examples, the plurality of equally spaced optical frequency carriers may have a same amplitude or similar amplitude, resulting in a flat spectral profile. In some other examples, the plurality of equally spaced optical frequency carriers may have different amplitudes. An example of the optical frequency comb is shown in FIG. 5 as directed by arrow 515. As shown, the spectral spacing between the adjacent optical frequency carriers, denoted by $\Delta\Omega$, is the same. In an embodiment, $\Delta\Omega$ may be below 10 GHz, 10 GHz, between 10 GHz and 20 GHz, 20 GHz, between 20 GHz and 30 GHz, 30 GHz, between 30 GHz and 40 GHz, 40 GHz, between 40 GHz and 50 GHz, 50 GHz, and so on. In an embodiment, the comb source 510 may be coupled to the data processor 170, which may be used to adjust the nominal carrier frequencies of the plurality of equally spaced optical frequency carriers and/or the spacing between the adjacent optical frequency carriers of the comb source 510, i.e., $\Delta\Omega$.

The tunable optical filter 520 may be configured to select one optical frequency carrier from the plurality of equally spaced optical frequency carriers provided by the comb source 510. The tunable optical filter 520 may be further configured to provide the selected optical frequency carrier to the optical modulator 220. In an embodiment, the tunable optical filter 520 may be a tunable optical bandpass filter. For example, the tunable optical filter 520, whose spectral profile is denoted as a dashed box 545 in the optical spectral profile as directed by arrow 525, may have an operating frequency at around $\omega_{(c,2)}$ with a predetermined bandwidth. As such, the tunable optical filter 520 may be used to select an optical frequency carrier centered at the nominal carrier frequency of $\omega_{(c,2)}$, while filtering out the other optical frequency carriers. As a result, the tunable optical filter 520 may provide an electromagnetic radiation (i.e., the selected optical frequency carrier) at the nominal carrier frequency of $\omega_{(c,2)}$, as directed by arrow 535, to the optical modulator 220. In an embodiment, the tunable optical filter 520 may be a tunable optical band-stop filter.

In an embodiment, the tunable optical filter 520 may be coupled to the data processor 170, which may be used to control and adjust the operating frequency of the tunable optical filter 520. For example, the operating frequency of the tunable optical filter 520 may be red shifted (e.g., as shown in the leftward arrow) or blue shifted (e.g., as shown in the rightward arrow). This is done so that an optical frequency carrier at another carrier frequency may be selected and provided by the radiation generator 210 to the optical modulator 220 after adjustment.

Figure 6:
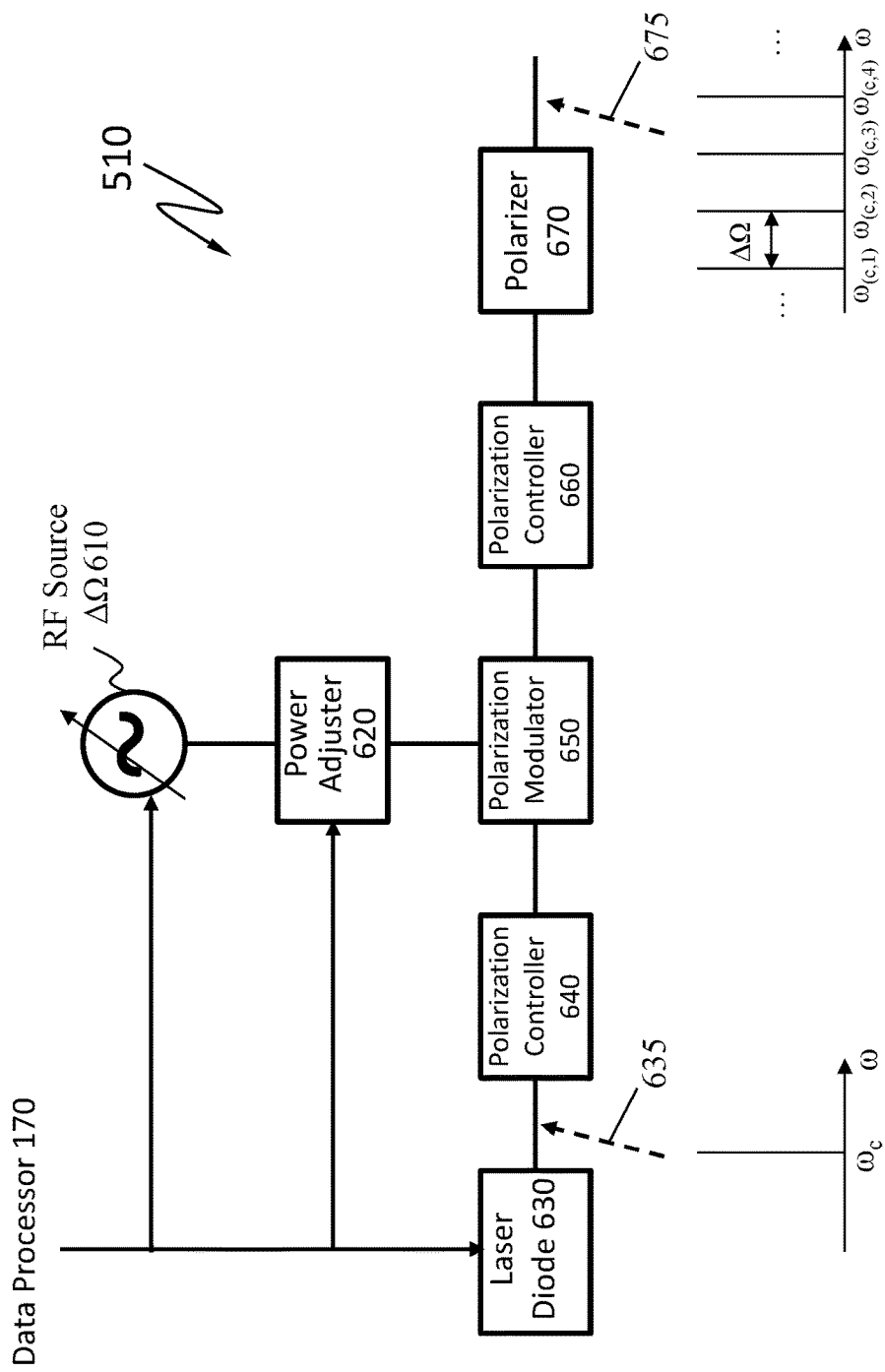
FIG. 6 is a schematic diagram of a comb source according to an embodiment of the present disclosure.

Referring to FIG. 6, a schematic diagram of the comb source 510 is shown according to an embodiment of the present disclosure. As shown, the comb source 510 includes a laser diode 630, a first polarization controller 640, an RF source 610, a power adjuster 620, a polarization modulator 650, a second polarization controller 660, and a polarizer 670. The first polarization controller 640 may be similar to the second polarization controller 660. As shown, the laser diode 630, the RF source 610, and/or the power adjuster 620 may be coupled to the data processor 170.

The laser diode 630 may be configured to provide an electromagnetic radiation having a single optical frequency carrier at a nominal carrier frequency of $\omega_c$ (for example, as shown in FIG. 6 and directed by arrow 635). In an embodiment, the laser diode 630 may be a continuous wave laser configured to provide the single optical frequency carrier at the nominal carrier frequency of $\omega_c$ with a narrow bandwidth (or a narrow linewidth). In an embodiment, the nominal carrier frequency of $\omega_c$ may be adjusted by the data processor 170. In an embodiment, the tuning range of the laser diode 630 may be smaller than the tuning range of the tunable optical filter 520 in FIG. 5.

The first polarization controller 640 may be coupled to the laser diode 630 and configured to tune the polarization state of the electromagnetic radiation received from the laser diode 630. The first polarization controller 640 may be further configured to output the electromagnetic radiation to the polarization modulator 650 after the polarization state is adjusted.

The polarization modulator 650 may be coupled to the first polarization controller 640 and the power adjuster 620. The polarization modulator 650 may be configured to modulate the polarization of the electromagnetic radiation received from the first polarization controller 640 according to the RF signal received from the power adjuster 620. The polarization modulator 650 may be further configured to provide the electromagnetic radiation after polarization modulation to the second polarization controller 660.

The RF source 610 may be configured to provide an RF signal to the power adjuster 620 at a frequency of $\Delta\Omega$. In an embodiment, the RF source 610 may be coupled to the data processor 170, which may be used to adjust the power and/or the frequency of $\Delta\Omega$.

The power adjuster 620 may be coupled to the RF source 610 and configured to adjust the power of the RF signal provided to the polarization modulator 650. In an embodiment, the power adjuster 620 may comprise a tunable RF amplifier with an adjustable power amplification. In an embodiment, the power adjuster 620 may comprise a tunable RF attenuator with an adjustable power attenuation. In an embodiment, the amount of power amplification and/or power attenuation may be adjusted by the data processor 170.

The second polarization controller 660 may be coupled to the polarization modulator 650 and configured to adjust the polarization state of the electromagnetic radiation received from the polarization modulator 650. The second polarization controller 660 may be further configured to provide the electromagnetic radiation after the polarization state is adjusted to the polarizer 670.

The polarizer 670 may be configured to receive the electromagnetic radiation from the second polarization controller 660 and output a portion of the electromagnetic radiation matching to a predefined polarization. By carefully adjusted the first polarization controller 640, the power adjuster 620, the polarization modulator 650, and the second polarization controller 660, the outputted portion of the electromagnetic radiation may be an optical frequency comb with an equal spacing of $\Delta\Omega$ and a flat spectral profile, for example, as shown in FIG. 6 as directed by arrow 675. In some examples, the comb source 510 may comprise more than one polarization modulator 650 to provide a larger number of optical frequency carriers. More details about the comb source 510 may be found in Chao He, et. al, "Ultrafast optical frequency comb generated based on cascaded polarization modulators," Optics Letters Vol. 37, No. 18, pages 3834-3836, published on Sep. 15, 2012, which is incorporated by reference in its entirety.

Figure 7:
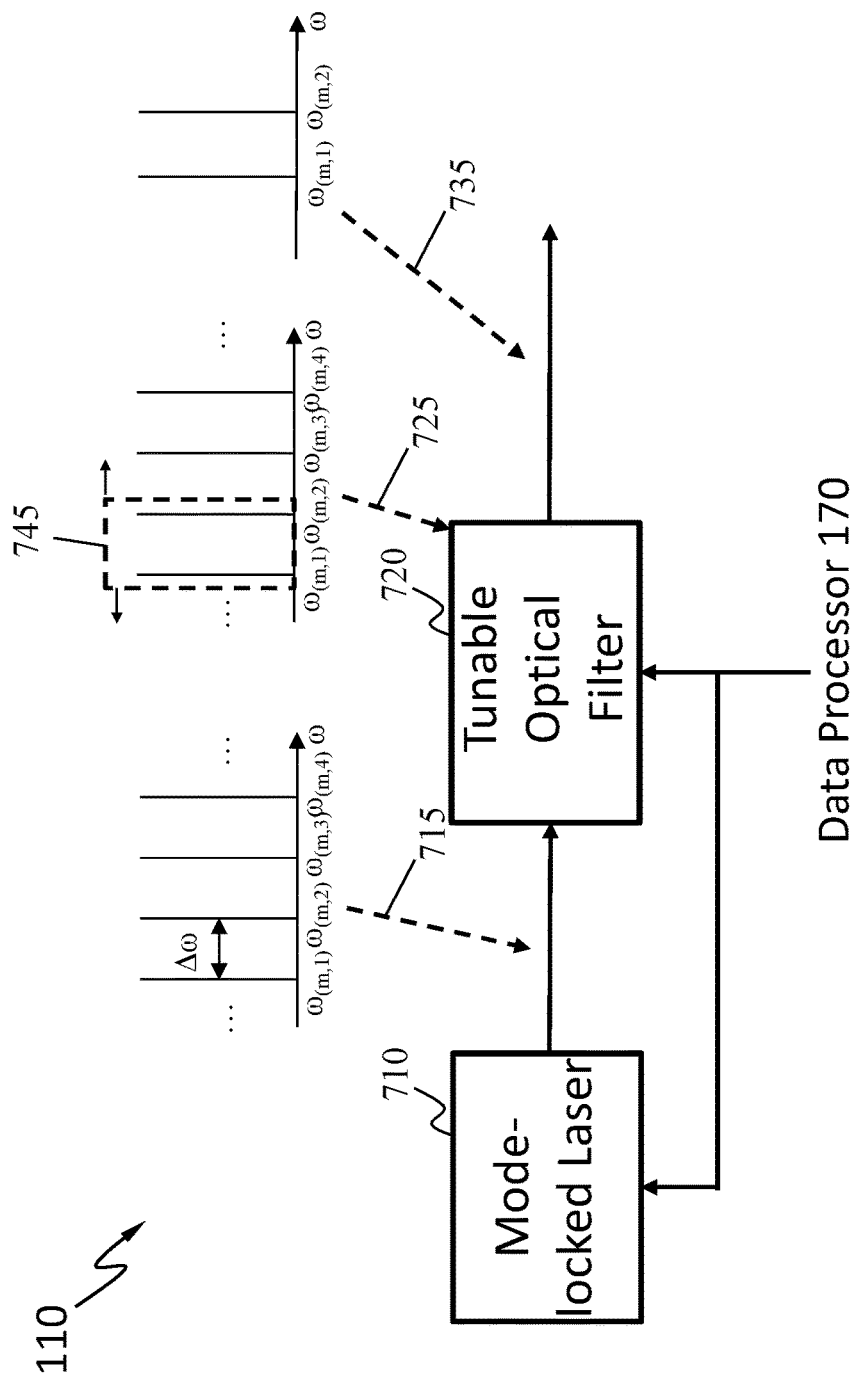
FIG. 7 is a schematic diagram of yet another embodiment of the optical detecting signal generator.

Referring to FIG. 7, a schematic diagram of another embodiment of the optical detecting signal generator 110 is depicted. In this embodiment, the optical detecting signal generator 110 may include a mode-locked laser 710 and a tunable optical filter 720 coupled to the mode-locked laser 710.

The mode-locked laser 710 may be configured to provide an optical frequency comb comprising a plurality of equally spaced optical frequency carriers. In some examples, the plurality of equally spaced optical frequency carriers may have the same amplitude or similar amplitudes, resulting in a flat spectral profile. In some other examples, the plurality of equally spaced optical frequency carriers may have different amplitudes. An example of the optical frequency comb is shown in FIG. 7 as directed by arrow 715. As shown, the plurality of equally spaced optical frequency carriers has a plurality of nominal carrier frequencies, some of which are denoted by $\omega_{(M,1)}$, $\omega_{(M,2)}$, $\omega_{(M,3)}$, and $\omega_{(M,4)}$ as shown in FIG. 7. The spectral spacing between the adjacent optical frequency carriers, denoted by $\Delta\omega$, is the same. In an embodiment, $\Delta\omega$ may be below 1 MHz, 1 MHz, between 1 MHz and 10 MHz, 10 MHz, between 10 MHz and 100 MHz, 100 MHz, between 100 MHz and 1 GHz, 1 GHz, and so on. In an embodiment, the mode-locked laser 710 is a mode-locked fiber laser. In an embodiment, the mode-locked laser 710 may be coupled to the data processor 170, which may be used to adjust the frequencies of the plurality of equally spaced optical frequency carriers and/or the spacing, i.e., $\Delta\omega$, between the adjacent optical frequency carriers of the mode-locked laser 710.

The tunable optical filter 720 may be configured to select two of the plurality of equally spaced optical frequency carriers provided by the mode-locked laser 710. In an embodiment, the tunable optical filter 720 may be configured to select two adjacent optical frequency carriers from the plurality of equally spaced optical frequency carriers provided by the mode-locked laser 710. The tunable optical filter 720 may be further configured to output the selected carriers. In an embodiment, the tunable optical filter 720 is a tunable optical bandpass filter. For example, the tunable optical filter 720, whose spectral profile is denoted by a dashed box 745 in FIG. 7 as directed by arrow 725, may have an operating bandwidth and/or operating frequency range including the frequencies of the selected optical frequency carriers, for example, $\omega_{(M,1)}$ and $\omega_{(M,2)}$ (and excluding the nominal carrier frequencies of the other unselected optical frequency carriers). As a result, the tunable optical filter 720 may provide the filtered radiation or the filtered optical spectrum including the selected optical frequency carrier, for example, having the nominal carrier frequencies of $\omega_{(M,1)}$ and $\omega_{(M,2)}$, as shown and directed by arrow 735. In an embodiment, the tunable optical filter 720 is a tunable optical band-stop filter.

In an embodiment, the tunable optical filter 720 may be coupled to the data processor 170, which may be used to control and adjust the operating bandwidth and/or operating frequency range of the tunable optical filter 720. For example, when the tunable optical filter 720 is a tunable optical bandpass filter, the operating frequency range (indicated by the spectral profile 745) of the tunable optical filter 720 may be red shifted (e.g., as shown in the leftward arrow) or blue shifted (e.g., as shown in the rightward arrow), for example, controlled by the data processor 170. This is done so that another pair of optical frequency carriers may be selected and provided by the optical detecting signal generator 110 after adjustment.

Figure 8:
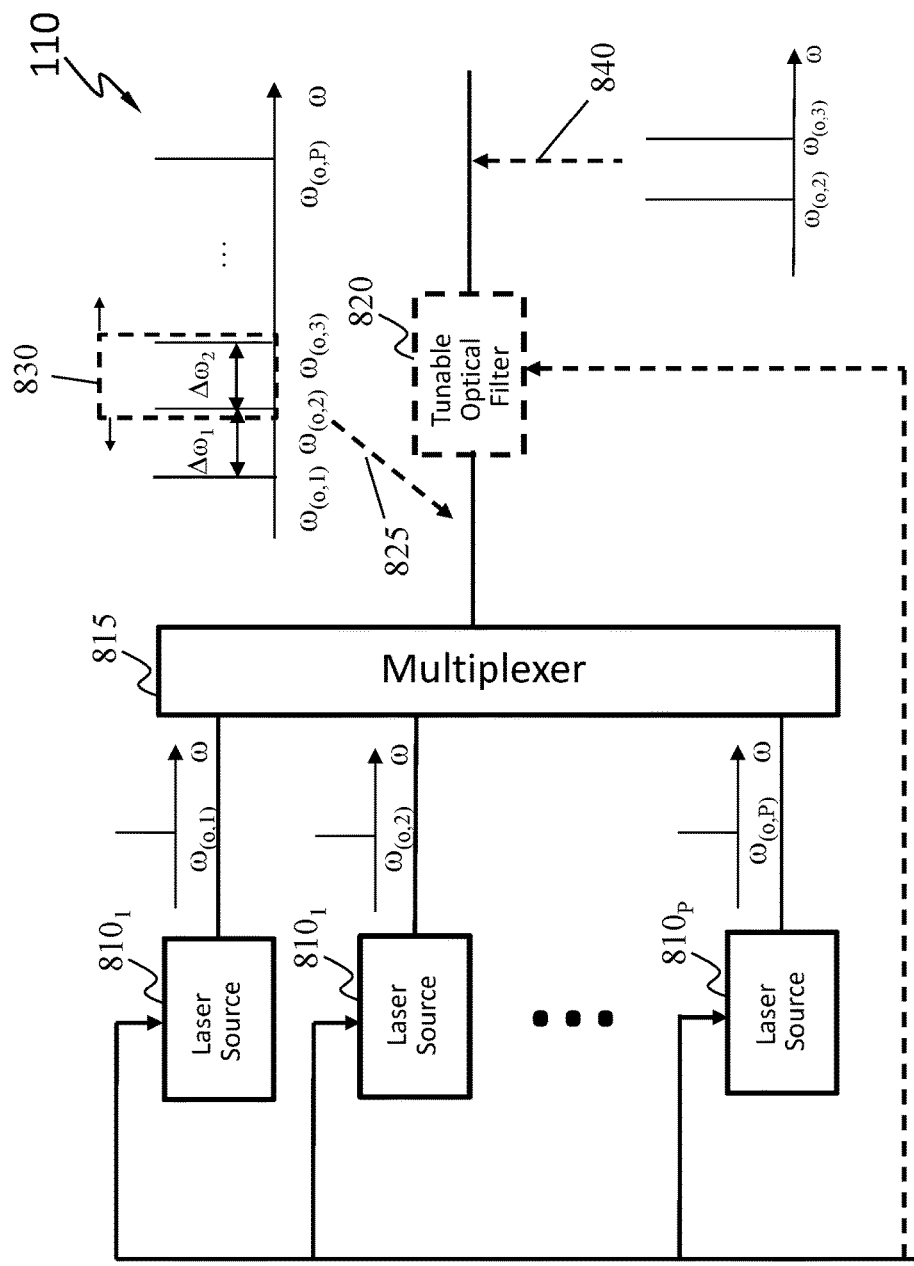
FIG. 8 is a schematic diagram of yet another embodiment of the optical detecting signal generator.

Referring to FIG. 8, a schematic diagram of another embodiment of the optical detecting signal generator 110 is depicted. In this embodiment, the optical detecting signal generator 110 includes a plurality of laser sources $810_{1, 2, \ldots, P}$, where the number of laser sources $810_{1, 2, \ldots, P}$ is denoted by a positive integer, P. The optical detecting signal generator 110 further includes a multiplexer 815 coupled to the plurality of laser sources $810_{1, 2, \ldots, P}$. In some examples, the optical detecting signal generator 110 may further include a tunable optical filter 820. In some other examples, the optical detecting signal generator 110 may not include the tunable optical filter 820.

Each of the plurality of laser sources $810_{1, 2, \ldots, P}$ may be configured to emit a radiation including one or more optical frequency carriers. In an embodiment, each of the plurality of laser sources $810_{1, 2, \ldots, P}$ may be a continuous wave laser configured to emit a radiation having a different single nominal carrier frequency. For example, as shown, the first laser source $810_1$ may emit a first radiation having a first nominal carrier frequency, $\omega_{(o,1)}$, the second laser source $810_2$ may emit a second radiation having a second nominal carrier frequency, $\omega_{(o,2)}$, ..., and the $P_{th}$ laser source $810_P$ may emit a $P_{th}$ radiation having a $P_{th}$ nominal carrier frequency, $\omega_{(o,P)}$. In an embodiment, the plurality of laser sources $810_{1, 2, \ldots, P}$ may be coupled to the data processor 170, which may be used to adjust one or more nominal carrier frequencies selected from $\omega_{(o,1)}$, $\omega_{(o,2)}$, ..., and $\omega_{(o,P)}$.

The multiplexer 815 may include a plurality of input ports coupled to the plurality of laser sources $810_{1, 2, \ldots, P}$ and configured to receive the plurality of radiations, including a plurality of carrier frequencies denoted by $\omega_{(o,1)}$, $\omega_{(o,2)}$, ..., $\omega_{(o,P)}$, provided by the plurality of laser sources $810_{1, 2, \ldots, P}$. The multiplexer 815 may be further configured to combine the plurality of radiations and output, through an output port of the multiplexer 815, the combined radiation. An example combined radiation is shown in FIG. 8 as directed by arrow 825. As shown, the difference between the first carrier frequency, $\omega_{(o,1)}$ and the second carrier frequency, $\omega_{(o,1)}$ is denoted by $\Delta\omega_1$, the difference between the second carrier frequency, $\omega_{(o,2)}$ and the third carrier frequency, $\omega_{(o,3)}$ is denoted by $\Delta\omega_2$, and so on. In an embodiment, the spacing between adjacent optical frequency carriers in the combined radiation may be equal. In an embodiment, the spacing between adjacent optical frequency carriers in the combined radiation may not be the same. In an embodiment, the multiplexer 815 may be configured by employing a plurality of 2×1 optical fiber combiners.

In an embodiment, the optical detecting signal generator 110 may not include the tunable optical filter 820. Accordingly, the combined radiation may be outputted directly through the output port of the multiplexer 815. This can be done when a specific pair of optical frequency carriers included in the combined radiation has a spacing smaller than any other pair of optical frequency carriers included in the combined radiation, and none of the plurality of carrier frequencies, e.g., $\omega_{(o,1)}$, $\omega_{(o,2)}$, ..., $\omega_{(o,P)}$ and any difference in frequency between any pair of optical frequency carriers, except the specific pair of optical frequency carriers included in the combined radiation, falls within the operating bandwidth or operating frequency range of the optical to electrical converter 130 in the optical vector analyzer 100 as shown in FIG. 1. The output port of the multiplexer 815 is the output port of the optical detecting signal generator 110, i.e., port A.

In an embodiment, the optical detecting signal generator 110 may further include the tunable optical filter 820 configured to provide a filtered radiation upon receipt of the combined radiation. In an embodiment, the tunable optical filter 820 may be a tunable bandpass filter. Accordingly, the tunable optical filter 820 may be configured to select a pair of optical frequency carriers from the combined radiation as the spectral difference between the pair of optical frequency carriers is within the operating frequency range or operating bandwidth of the optical to electrical converter 130. Optionally, the tunable optical filter 820 may be further configured to select one or more additional optical frequency carriers when the spectral spacing of the pair of optical frequency carriers is smaller than any other pair of optical frequency carriers selected from the combined radiation. For example, the operating frequency range of the tunable optical filter 820 may be indicated by a corresponding spectral profile and illustrated by a dashed box 830. In this example, only the second carrier frequency, $\omega_{(o,2)}$, and the third carrier frequency, $\omega_{(o,3)}$ are within the optical frequency range of the tunable optical filter 820. As a result, the filtered radiation, as shown in an example spectral profile as directed by arrow 840, includes only the second carrier frequency, $\omega_{(o,2)}$, and the third carrier frequency, $\omega_{(o,3)}$. In an embodiment, the tunable optical filter 820 may be a tunable band-stop filter.

In an embodiment, the tunable optical filter 820 may be coupled to the data processor 170, which may be used to tune the operating frequency range of the tunable optical filter 820. For example, when the tunable optical filter 820 is a tunable optical bandpass filter, the operating frequency range (indicated by the spectral profile 830) of the tunable optical filter 820 may be red shifted (e.g., as shown in the leftward arrow) or blue shifted (e.g., as shown in the rightward arrow), for example, controlled by the data processor 170. This is done so that other suitable one or more optical frequency carriers may be selected and provided by the optical detecting signal generator 110 after adjustment.

Figure 9:
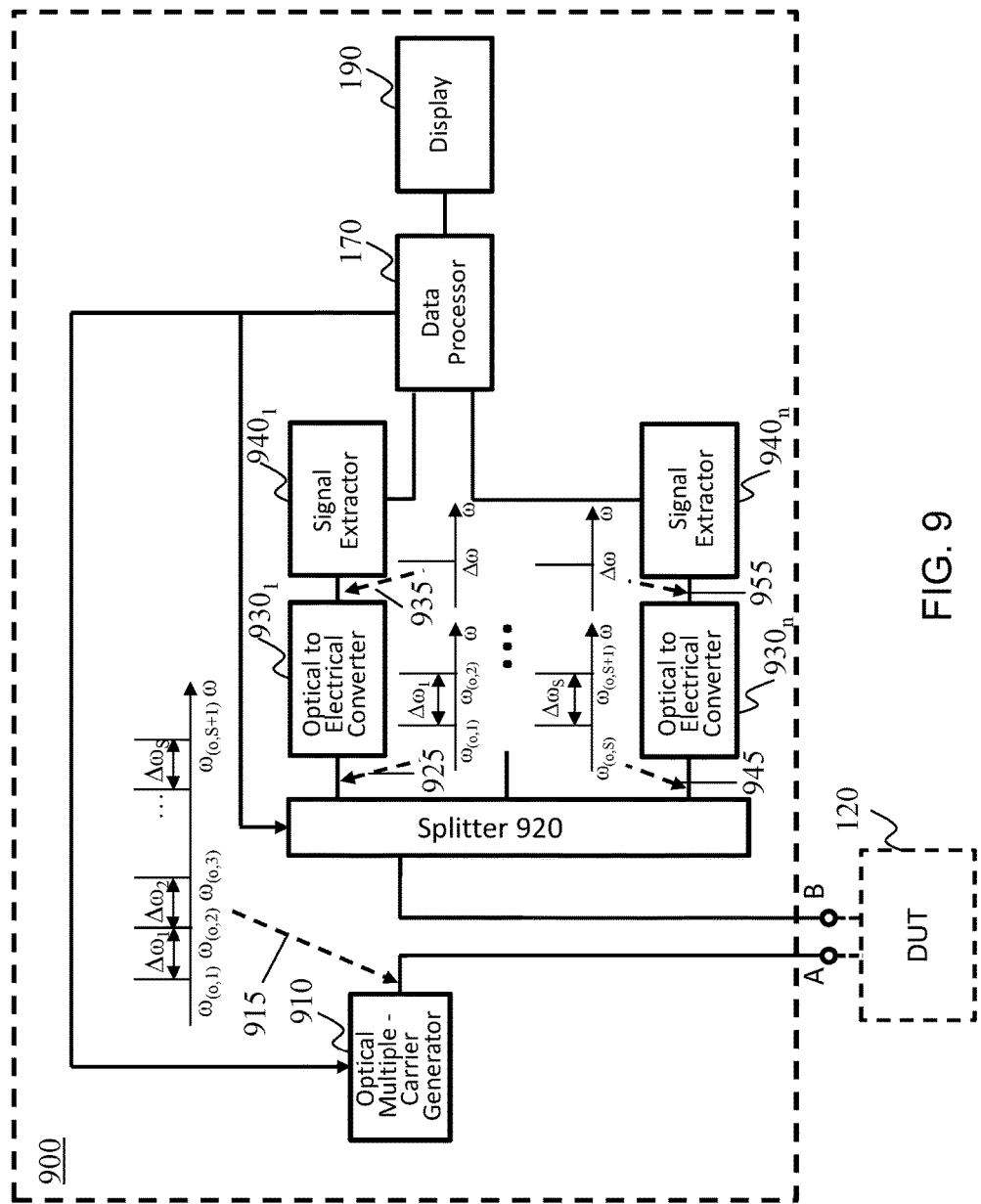
FIG. 9 is a schematic diagram of another optical vector analyzer suitable for performing optical vector analysis on a DUT according to an embodiment of the present disclosure.

Referring to FIG. 9, a schematic diagram of another optical vector analyzer 900 is shown according to an embodiment of the disclosure. The optical vector analyzer 900 may be suitable to perform the optical vector analysis of the DUT 120. As shown, the optical vector analyzer 900 comprises an optical multiple-carrier generator 910, a splitter 920, a plurality of optical to electrical converters $930_{1, 2, \ldots, n}$, a plurality of signal extractors $940_{1, 2, \ldots, n}$, the data processor 170, and the display 190.

The optical multiple-carrier generator 910 may be configured to provide an electromagnetic radiation having a plurality of optical frequency carriers, each of which corresponding to a different nominal carrier frequency. An example spectral profile of the electromagnetic radiation provided by the optical multiple-carrier generator 910 is shown in FIG. 9 as directed by arrow 915. As shown, the electromagnetic radiation provided by the optical multiple-carrier generator 910 includes a plurality of carrier frequencies denoted by $\omega_{(o,1)}$, $\omega_{(o,2)}$, . . . , and $\omega_{(o,S+1)}$. In addition, the difference between the first carrier frequency $\omega_{(o,1)}$, and the second carrier frequency, $\omega_{(o,2)}$, is denoted by $\Delta\omega_1$, the difference between the second carrier frequency $\omega_{(o,2)}$, and the third carrier frequency, $\omega_{(o,3)}$, is denoted by $\Delta\omega_2$, . . . , and the difference between the $S_{th}$ carrier frequency $\omega_{(o,S)}$, and the $(S+1)_{th}$ carrier frequency, $\omega_{(o,S+1)}$, is denoted by $\Delta\omega_S$. In an embodiment, the optical multiple-carrier generator 910 may be configured similarly to the comb source 510. Accordingly, $\Delta\omega_1 = \Delta\omega_2 = \ldots = \Delta\omega_S$. In an embodiment, the optical multiple-carrier generator 910 may be configured similarly to the optical detecting signal generator 110 as shown in FIG. 8, excluding the tunable optical filter 820. In this embodiment, the differences between adjacent nominal carrier frequencies are equal, i.e., $\Delta\omega_1 = \Delta\omega_2 = \ldots = \Delta\omega_S$. Alternatively, at least two of the differences between the adjacent carrier frequencies are not the same.

In an embodiment, the optical multiple-carrier generator 910 may be coupled to the data processor 170, which may adjust the nominal carrier frequencies and/or the differences between adjacent carrier frequencies of the electromagnetic radiation provided by the optical multiple-carrier generator 910. The optical multiple-carrier generator 910 further includes an output port, denoted by port A, configured to output the electromagnetic radiation.

The splitter 920 may have an input port, denoted as the port B. In an embodiment, the input port of the splitter 920, i.e., the port B, may be coupled to the output port of the optical multiple-carrier generator, i.e., the port A (for example, during the system calibration process). As a result, the splitter 920 may be configured to receive the electromagnetic radiation provided by the optical multiple-carrier generator 910 directly without the electromagnetic radiation passing through the DUT 120. In an embodiment, the input port of the splitter 920, i.e., the port B, may be coupled to the output port of the DUT 120 as the output port of the optical multiple-carrier generator 910, i.e., port A is coupled to the input port of the DUT 120. As a result, the splitter 920 may be configured to receive the electromagnetic radiation provided by the optical multiple-carrier generator 910 after the electromagnetic radiation passing through the DUT 120.

In either situation, the splitter 920 may be further configured to provide a plurality of portions of the electromagnetic radiation, and direct each portion to a respective one of a plurality of frequency channels. Specifically, each portion of the electromagnetic radiation may include a specific pair of carrier frequencies. When a portion of the electromagnetic radiation includes more than two carrier frequencies, the specific pair of carrier frequencies can be determined such that a difference between the specific pair of carrier frequencies is smaller than any other pair of carrier frequencies selected from the more than two carrier frequencies. Further, each of the plurality of frequency channels includes one optical to electrical converter $930_{1, 2, \ldots, n}$ followed by one signal extractor $940_{1, 2, \ldots, n}$. The optical to electrical converters $930_{1, 2, \ldots, n}$ are similar to the optical to electrical converter 130 in FIG. 1. Each of the optical to electrical converters may be configured to convert the corresponding portion of the electromagnetic radiation to an electrical current including a single nominal carrier frequency equal to the spectral difference of the corresponding specific pair of the nominal carrier frequencies. Example portions of the electromagnetic radiation provided to the optical to frequency converters $930_{1, 2, \ldots, n}$ is shown in FIG. 9 as directed by arrows 925 and 945, as example spectral profiles of the electrical currents provided by the optical to electrical converters $930_{1, 2, \ldots, n}$ are shown as directed by arrows 935 and 955. Further, the signal extractors $940_{1, 2, \ldots, n}$ are similar to the signal extractor 150 in FIG. 1. The signal extractors $940_{1, 2, \ldots, n}$ are configured to extract the amplitude and the phase of the corresponding electrical currents provided by the corresponding optical to electrical converters $930_{1, 2, \ldots, n}$, which are subsequently provided to the data processor 170 followed by the display 190. With respect to each frequency channel, the data processor 170 may determine the transfer function of the DUT 120 at an average of carrier frequencies in relation to the corresponding specific pair of carrier frequencies.

In an embodiment, the splitter 920 may be coupled to the data processor 170, which may be used to determine each of the plurality of portions of the electromagnetic radiation to be selected by the splitter 920 to the corresponding channel.

Similar to the description above associated with the optical vector analyzer 100, the device characterization process and the system calibration process as described associated with FIG. 1 may be implemented respectively in order to perform the optical vector analysis on the DUT 120 using the optical vector analyzer 900. However, by including a plurality of frequency channels in parallel each comprising an optical to electrical converter $930_{1, 2, \ldots, n}$ and a signal extractor $940_{1, 2, \ldots, n}$, the data processor 170 in FIG. 9 may determine the transfer function of the DUT 120 at a greater number of operating frequencies upon completion of one device characterization process and one system calibration process. Further, one or more additional device characterization processes and system calibration processes, as described above, may be performed to determine, by, e.g., the data processor 170 in the optical vector analyzer 900 as shown in FIG. 9, the transfer functions of the DUT 120 at other operating frequencies after adjusting the nominal carrier frequencies associated with the electromagnetic radiation provided by the optical multiple-carrier generator 910.

Figure 10:
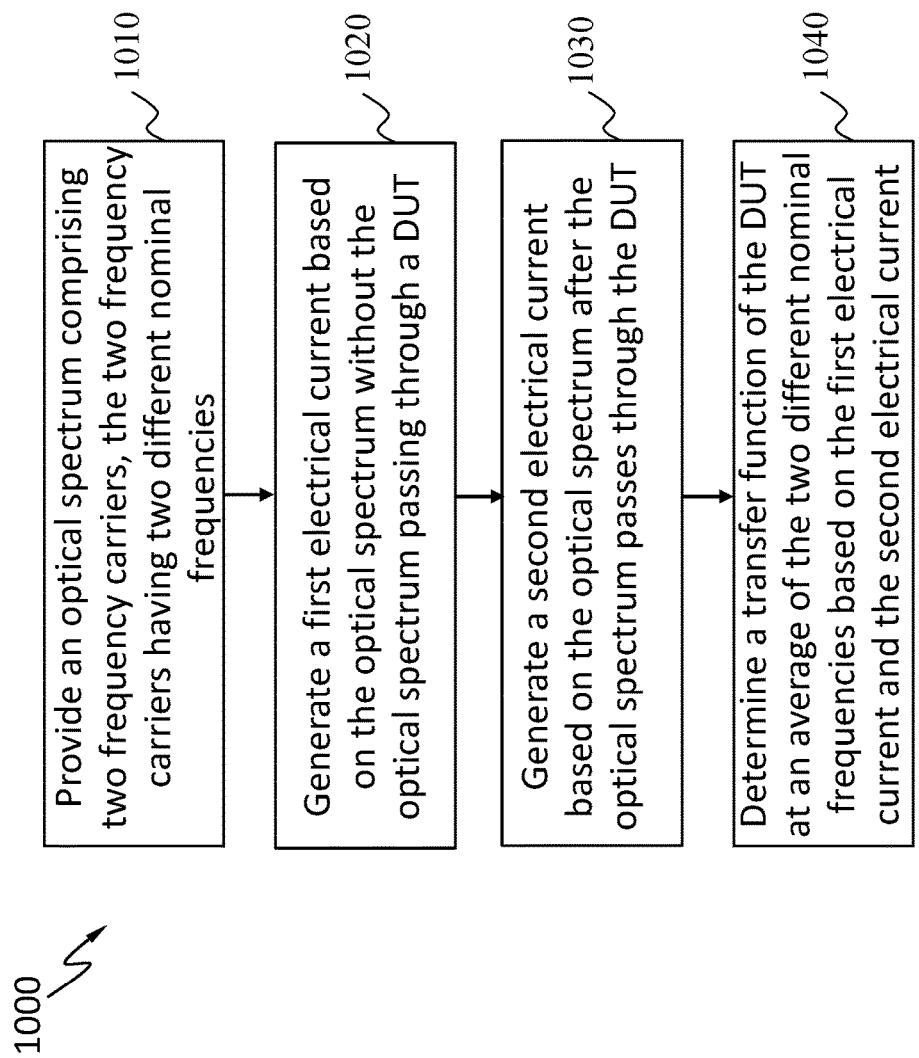
FIG. 10 is a flowchart of an exemplary process for performing an optical vector analysis on a DUT by an optical vector analyzer according to an embodiment of the disclosure.

Referring to FIG. 10, a flowchart 1000 of an exemplary process for performing the optical vector analysis on a DUT is shown according to an embodiment of the disclosure. In an embodiment, the exemplary process as shown in the flowchart 1000 may be performed by the optical vector analyzers 100, 900.

At step 1010, an optical spectrum comprising two frequency carriers is provided. Specifically, the two frequency carriers have two different nominal carrier frequencies. In an embodiment, the optical spectrum has, in addition to the two frequency carriers, one or more additional frequency carriers. Any pair of spectrum carriers, except the two frequency carriers, selected from a group consisting of the two frequency carriers and the one or more additional frequency carriers has a difference in frequency greater than the spacing between the two frequency carriers. In an embodiment, the optical spectrum may be provided by the optical detecting signal generator 110 or the optical multiple-carrier generator 910.

At step 1020, a first electrical current is generated based on the optical spectrum without the optical spectrum passing through the DUT, e.g., the DUT 120. In an embodiment, the first electrical current may be generated by the optical to electrical converter 130, or $930_{1, 2, \ldots, n}$. The step 1020 may be performed in a system calibration process, when, as shown in FIG. 1, the output port, i.e., port A, of the optical detecting signal generator 110 is coupled directly to the input port, i.e., port B, of the optical to electrical converter 130, or when, as shown in FIG. 9, the output port, i.e., port A, of the optical multiple-carrier generator 910 is coupled directly to the input port, i.e., port B, of the splitter 920.

At step 1030, a second electrical current is generated based on the optical spectrum after the optical spectrum passes through the DUT, e.g., the DUT 120. In an embodiment, the second electrical current may be generated by the optical to electrical converter 130, or $930_{1, 2, \ldots, n}$. The step 1030 may be performed in a device characterization process, when, as shown in FIG. 1, the output port, i.e., port A, of the optical detecting signal generator 110 is coupled to the input port of the DUT 120 as the input port, i.e., port B, of the optical to electrical converter 130 is coupled to the output port of the DUT 120, or when, as shown in FIG. 9, the output port, i.e., port A, of the optical multiple-carrier generator 910 is coupled to the input port of the DUT 120 as the input port, i.e., port B, of the splitter 920 is coupled to the output port of the DUT 120.

At step 1040, a transfer function of the DUT, e.g., the DUT 120, is determined at an average of the two different nominal carrier frequencies based on the first electrical current and the second electrical current. In an embodiment, the transfer function of the DUT, e.g., the DUT 120, may be determined by the data processor 170 in FIG. 1 and FIG. 9.

In an embodiment, there is provided an apparatus comprising: an optical detecting signal generator configured to provide, through an output port of the optical detecting signal generator, an optical spectrum comprising two frequency carriers, the two frequency carriers having two different nominal carrier frequencies, and the output port of the optical detecting signal generator being further configured to be coupled to a DUT; an optical to electrical converter configured to: generate a first electrical current based on the optical spectrum without the optical spectrum passing through the DUT; and generate a second electrical current based on the optical spectrum after the optical spectrum passes through the DUT; and a data processor coupled to the optical to electrical converter, the data processor being configured to determine a transfer function of the DUT at an average of the two different nominal carrier frequencies based on the first electrical current and the second electrical current.

In an embodiment, the optical spectrum comprises one or more additional frequency carriers in addition to the two frequency carriers, and any pair of frequency carriers, except the two frequency carriers, selected from a group consisting of the one or more additional frequency carriers and the two frequency carriers has a spacing in frequency greater than a difference between the two different nominal carrier frequencies.

In an embodiment, both the first electrical current and the second electrical current have a single nominal carrier frequency equal to a difference between the two different nominal carrier frequencies.

In an embodiment, the apparatus further comprises a signal extractor coupled to the optical to electrical converter and the data processor, the signal extractor being configured to: receive, through an input port of the signal extractor, an electrical current from the optical to electrical converter; extract an amplitude and a phase of the electrical current; and provide, through an output port of the signal extractor, the amplitude and the phase of the electrical current to the data processor, wherein the electrical current is either the first electrical current or the second electrical current.

In an embodiment, the transfer function of the DUT at the average of the two different nominal carrier frequencies is determined by:

$$\left| H_{DUT}\left(\frac{\omega_{(o,1)} + \omega_{(o,2)}}{2}\right) \right| = \sqrt{\frac{|i(\omega_{(o,2)} - \omega_{(o,1)})|}{|i_{SYS}(\omega_{(o,2)} - \omega_{(o,1)})|}} ; \text{ and}$$

$$D_{DUT}\left(\frac{\omega_{(o,1)} + \omega_{(o,2)}}{2}\right) = \frac{e^{j\{\phi[i(\omega_{(o,2)} - \omega_{(o,1)})] - \phi[i_{SYS}(\omega_{(o,2)} - \omega_{(o,1)})]\}}}{(\omega_{(o,2)} - \omega_{(o,1)})},$$

wherein $\left| H_{DUT}\left(\frac{\omega_{(o,1)} + \omega_{(o,2)}}{2}\right) \right|$ is an amplitude of the transfer function of the DUT at the average of the two different nominal carrier frequencies, denoted by $\omega(o,1)$ and $\omega(o,2)$, respectively, wherein $i_{SYS}(\omega(o,2) - \omega(o,1))$ is the first electrical current, and $i(\omega(o,2) - \omega(o,1))$ is the second electrical current, wherein $|i_{SYS}(\omega(o,2) - \omega(o,1))|$ is an amplitude of the first electrical current, and $|i(\omega(o,2) - \omega(o,1))|$ is an amplitude of the second electrical current, and wherein $\phi[i_{SYS}(\omega(o,2) - \omega(o,1))]$ is a phase of the first electrical current, and $\phi[i(\omega(o,2) - \omega(o,1))]$ is a phase of the second electrical current.

In an embodiment, the optical detecting signal generator comprises: a radiation generator configured to emit, through an output port of the radiation generator, a radiation having a nominal wavelength; and an optical modulator coupled to the radiation generator, the optical modulator being configured to: receive, through a first input port of the optical modulator, the radiation from the radiation generator; receive, through a second input port of the optical modulator, a first RF signal having a first RF frequency, and a second RF signal having a second RF frequency, the first RF frequency being different than the second RF frequency; generate the optical spectrum by modulating the radiation based on the first RF signal and the second RF signal; and output, through an output port of the optical modulator, the optical spectrum.

In an embodiment, the radiation generator comprises: a comb source configured to provide an optical frequency comb having a plurality of equally spaced optical frequency carriers; and a tunable optical filter coupled to the comb source, the tunable optical filter being configured to output one frequency carrier, controllable by the data processor, of the optical frequency comb.

In an embodiment, the optical detecting signal generator comprises: a mode-locked laser; and a tunable optical filter coupled to the mode-locked laser, wherein the tunable optical filter is configured to output two optical frequency carriers, controllable by the data processor, of a radiation provided by the mode-locked laser.

In an embodiment, there is provided a method comprising: providing an optical spectrum comprising two frequency carriers, the two frequency carriers having two different nominal carrier frequencies; generating a first electrical current based on the optical spectrum without the optical spectrum passing through a DUT; generating a second electrical current based on the optical spectrum after the optical spectrum passes through the DUT; and determining, by a data processor, a transfer function of the DUT at an average of the two different nominal carrier frequencies based on the first electrical current and the second electrical current.

In an embodiment, the optical spectrum comprises one or more additional frequency carriers in addition to the two frequency carriers, and any pair of frequency carriers, except the two frequency carriers, selected from a group consisting of the one or more additional frequency carriers and the two frequency carriers has a spacing in frequency greater than a difference between the two different nominal carrier frequencies.

In an embodiment, both the first electrical current and the second electrical current have a single nominal carrier frequency equal to a difference between the two different nominal carrier frequencies.

In an embodiment, the method further comprises: receiving an electrical current; extracting an amplitude and a phase of the electrical current; and providing the amplitude and the phase of the electrical current to the data processor, wherein the electrical current is either the first electrical current or the second electrical current.

In an embodiment, the transfer function of the DUT at the average of the two different nominal carrier frequencies is determined by:

$$\left| H_{DUT}\left(\frac{\omega_{(o,1)} + \omega_{(o,2)}}{2}\right) \right| = \sqrt{\frac{|i(\omega_{(o,2)} - \omega_{(o,1)})|}{|i_{SYS}(\omega_{(o,2)} - \omega_{(o,1)})|}} \text{; and}$$

$$D_{DUT}\left(\frac{\omega_{(o,1)} + \omega_{(o,2)}}{2}\right) = \frac{e^{j\{\phi[i(\omega_{(o,2)} - \omega_{(o,1)})] - \phi[i_{SYS}(\omega_{(o,2)} - \omega_{(o,1)})]\}}}{(\omega_{(o,2)} - \omega_{(o,1)})},$$

wherein $\left| H_{DUT}\left(\frac{\omega_{(o,1)} + \omega_{(o,2)}}{2}\right) \right|$ is an amplitude of the transfer function of the DUT at the average of the two different nominal carrier frequencies, denoted by ω(o,1) and ω(o,2), respectively, wherein $i_{SYS}$(ω(o,2)−ω(o,1)) is the first electrical current, and i(ω(o,2)−ω(o,1)) is the second electrical current, wherein $|i_{SYS}$(ω(o,2)−ω(o,1))| is an amplitude of the first electrical current, and |i(ω(o,2)−ω(o,1))| is an amplitude of the second electrical current, and wherein φ[$i_{SYS}$(ω(o,2)−ω(o,1))] is a phase of the first electrical current, and φ[i(ω(o,2)−ω(o,1))] is a phase of the second electrical current.

In an embodiment, the optical spectrum is provided by: receiving a first RF signal having a first RF frequency, and a second RF signal having a second RF frequency, the first RF frequency being different than the second RF frequency; generating the optical spectrum by modulating a radiation having a nominal wavelength based on the first RF signal and the second RF signal; and outputting the optical spectrum.

In an embodiment, the method further comprises generating the radiation, wherein the radiation is generated by: providing an optical frequency comb having a plurality of equally spaced optical frequency carriers; and outputting one frequency carrier of the optical frequency comb.

In an embodiment, there is provided an apparatus comprising: an optical multiple-carrier generator configured to provide, through an output port of the optical multiple-carrier generator, an optical spectrum having a plurality of optical frequency carriers, wherein the output port of the optical multiple-carrier generator is further configured to be coupled to a DUT; a splitter configured to: receive, through an input port of the splitter, the optical spectrum; and provide each of a plurality of portions of the optical spectrum to a respective one of a plurality of channels; the plurality of channels coupled to the splitter, wherein each of the plurality of channels comprises an optical to electrical converter, the optical to electrical converter being configured to: receive a respective portion of the optical spectrum, the respective portion of the optical spectrum comprising two frequency carriers, and the two frequency carriers having two different nominal carrier frequencies; generate a first electrical current based on the respective portion of the optical spectrum without the optical spectrum passing through the DUT; and generate a second electrical current based on the respective portion of the optical spectrum after the optical spectrum passes through the DUT; and a data processor coupled to the plurality of channels, wherein the data processor is configured to determine, with respect to each of the plurality of channels, a transfer function of the DUT at an average of the two different nominal carrier frequencies based on the first electrical current and the second electrical current.

In an embodiment, both the first electrical current and the second electrical current have a single nominal carrier frequency equal to a difference between the two different nominal carrier frequencies.

In an embodiment, each of the plurality of channels further comprises a signal extractor coupled to the optical to electrical converter, the signal extractor being configured to: receive, through an input port of the signal extractor, an electrical current from the optical to electrical converter; extract an amplitude and a phase of the electrical current; and provide, through an output port of the signal extractor, the amplitude and the phase of the electrical current to the data processor, wherein the electrical current is either the first electrical current or the second electrical current.

In an embodiment, the transfer function of the DUT at the average of the two different nominal carrier frequencies is determined by:

$$\left| H_{DUT}\left(\frac{\omega_{(o,1)} + \omega_{(o,2)}}{2}\right) \right| = \sqrt{\frac{|i(\omega_{(o,2)} - \omega_{(o,1)})|}{|i_{SYS}(\omega_{(o,2)} - \omega_{(o,1)})|}} \text{; and}$$

$$D_{DUT}\left(\frac{\omega_{(o,1)} + \omega_{(o,2)}}{2}\right) = \frac{e^{j\{\phi[i(\omega_{(o,2)} - \omega_{(o,1)})] - \phi[i_{SYS}(\omega_{(o,2)} - \omega_{(o,1)})]\}}}{(\omega_{(o,2)} - \omega_{(o,1)})},$$

wherein $\left| H_{DUT}\left(\frac{\omega_{(o,1)} + \omega_{(o,2)}}{2}\right) \right|$ is an amplitude of the transfer function of the DUT at the average of the two different nominal carrier frequencies, denoted by ω(o,1) and ω(o,2), respectively, wherein $i_{SYS}$ω(o,2)−ω(o,1)) is the first electrical current, and i(ω(o,2)−ω(o,1)) is the second electrical current, wherein $|i_{SYS}$(ω(o,2)−ω(o,1))| is an amplitude of the first electrical current, and |i(ω(o,2)−(ω(o,1))| is an amplitude of the second electrical current, and wherein φ[$i_{SYS}$(ω(o,2)−ω(o,1))] is a phase of the first electrical current, and φ[i(ω(o,2)−ω(o,1))] is a phase of the second electrical current.

In an embodiment, the optical multiple-carrier generator comprises: a plurality of laser sources configured to emit a plurality of radiations, each of the plurality of radiations having a different nominal wavelength; and a multiplexer coupled to the plurality of laser sources, wherein the multiplexer is configured to provide a combined radiation by combining the plurality of radiations.

Figure 11:
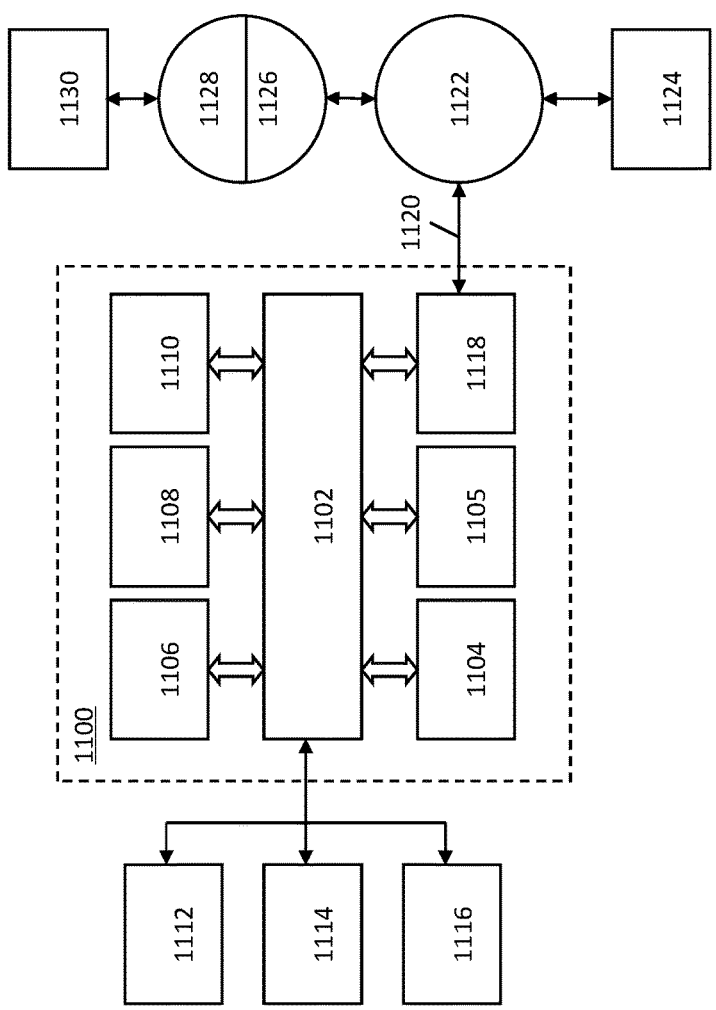
FIG. 11 depicts a general computer architecture on which the present disclosure can be implemented.

Referring to FIG. 11, a computer system 1100 is shown. The computer system 1100 includes a bus 1102 or other communication mechanism to communicate information, and a processor 1104 (or multiple processors 1104 and 1105) coupled with the bus 1102 to process information. In an embodiment, the computer system 1100 includes a main memory 1106, such as a random access memory (RAM) or other dynamic storage device, coupled to the bus 1102 to store information and instructions to be executed by the processor 1104. The main memory 1106 may be used to store temporary variables or other intermediate information during execution of instructions to be executed by the processor 1104. In an embodiment, the computer system 1100 includes a read only memory (ROM) 1108 or other static storage device coupled to the bus 1102 to store essentially static information and instructions for the processor 1104. In an embodiment, a storage device 1110, such as a solid state drive, magnetic disk or optical disk, is provided and coupled to the bus 1102 to store information and instructions.

The computer system 1100 may be coupled via the bus 1102 to a display 1112, such as a cathode ray tube (CRT) or flat panel or touch panel display, to display information to a computer user. In an embodiment, an input device 1114, including or providing alphanumeric and other keys, is coupled to the bus 1102 to communicate information and command selections to the processor 1104. Another type of user input device is a cursor controller 1116, such as a mouse, a trackball, or cursor direction keys, to communicate direction information and command selections to the processor 1104 and to control cursor movement on the display 1112. A touch panel (screen) display may also be used as an input device.

The computer system 1100 may be suitable to implement methods as described herein in response to the processor 1104 executing one or more sequences of one or more instructions contained in, e.g., the main memory 1106. Such instructions may be read into the main memory 1106 from another computer-readable medium, such as the storage device 1110. In an embodiment, execution of sequences of instructions contained in the main memory 1106 causes the processor 1104 to perform process steps described herein. One or more processors in a multi-processing arrangement may be employed to execute the sequences of instructions contained in the main memory 1106. In an embodiment, a hard-wired circuitry may be used in place of or in combination with software instructions. Thus, embodiments are not limited to any specific combination of hardware circuitry and software.

The term "computer-readable medium" as used herein refers to any medium that participates in providing instructions to the processor 1104 for execution. Such a medium may take many forms, including but not limited to, non-volatile media, volatile media, and transmission media. Non-volatile media include, for example, solid state, optical or magnetic disks, such as the storage device 1110. Volatile media include dynamic memory, such as the main memory 1106. Non-volatile and volatile media are considered non-transitory. Non-transitory transmission media include coaxial cables, copper wire and fiber optics, including the wires that comprise the bus 1102. Transmission media can also take the form of acoustic or light waves, such as those generated during RF and infrared (IR) data communications. Common forms of computer-readable media include, for example, a floppy disk, hard disk, magnetic tape, any other magnetic medium, a CD-ROM, DVD, any other optical medium, punch cards, paper tapes, any other physical medium with patterns of holes, an RAM, a PROM, and EPROM, a FLASH-EPROM, a solid state disk or any other memory chip or cartridge, a carrier wave as described herein, or any other medium from which a computer can read.

Various forms of computer readable media may be involved in carrying one or more sequences of one or more instructions to the processor 1104 for execution. For example, the instructions may initially be borne on a magnetic disk of a remote computer. The remote computer can load the instructions into its dynamic memory and send the instructions over communications medium (e.g., by line or wireless). The computer system 1100 can receive the transmitted data and place the data on the bus 1102. The bus 1102 carries the data to the main memory 1106, from which the processor 1104 retrieves and executes the instructions. The instructions received by the main memory 1106 may optionally be stored on the storage device 1110 either before or after execution by the processor 1104.

The computer system 1100 may also include a communication interface 1118 coupled to the bus 1102. The communication interface 1118 provides a two-way data communication coupling to a network link 1120 that is connected to a local network 1122. For example, the communication interface 1118 may be an integrated services digital network (ISDN) card or a modem to provide a data communication connection to a corresponding type of line. As another example, the communication interface 1118 may be a local area network (LAN) card to provide a data communication connection to a compatible LAN. Wireless links may also be implemented. In any such implementation, the communication interface 1118 sends and receives electrical, electromagnetic or optical signals that carry digital data streams representing various types of information.

The network link 1120 typically provides data communication through one or more networks to other data devices. For example, the network link 1120 may provide a connection through the local network 1122 to a host computer 1124 or to data equipment operated by an Internet Service Provider (ISP) 1126. The ISP 1126 in turn provides data communication services through the worldwide packet data communication network, commonly referred to as the internet 1128. The local network 1122 and the internet 1128 both use electrical, electromagnetic or optical signals that carry digital data streams. The signals through the various networks and the signals on the network link 1120 and through the communication interface 1118, which carry the digital data to and from the computer system 1100, are exemplary forms of carrier waves transporting the information.

The computer system 1100 can send messages and receive data, including program code, through the network(s), the network link 1120, and the communication interface 1118. In the internet example, a server 1130 might transmit a requested code for an application program through the internet 1128, the ISP 1126, the local network 1122 and the communication interface 1118. In accordance with one or more embodiments, one such downloaded application implements a method as described herein. The received code may be executed by the processor 1104 as it is received, and/or stored in the storage device 1110, or other non-volatile storage for later execution. In this manner, the computer system 1100 may obtain application code.

An embodiment may take the form of a computer program containing one or more sequences of machine-readable instructions describing a method as disclosed herein, or a data storage medium (e.g. semiconductor memory, magnetic or optical disk) having such a computer program stored therein. Further, the machine readable instruction may be embodied in two or more computer programs. The two or more computer programs may be stored on one or more different memories and/or data storage media.

Any controllers described herein may each or in combination be operable when the one or more computer programs are read by one or more computer processors located within at least one component of the optical vector analyzer. The controllers may each or in combination have any suitable configuration for receiving, processing, and sending signals. One or more processors are configured to communicate with the at least one of the controllers. For example, each controller may include one or more processors for executing the computer programs that include machine-readable instructions for the methods described above. The controllers may include data storage medium for storing such computer programs, and/or hardware to receive such medium. So the controller(s) may operate according the machine readable instructions of one or more computer programs.

Those skilled in the art will recognize that the present disclosure is amenable to a variety of modifications and/or enhancements. For example, although the implementation of various components described above may be embodied in a hardware device, it can also be implemented as a firmware, firmware/software combination, firmware/hardware combination, or a hardware/firmware/software combination.

While the foregoing description and drawings represent embodiments of the present disclosure, it will be understood that various additions, modifications, and substitutions may be made therein without departing from the spirit and scope of the principles of the present disclosure as defined in the accompanying claims. One skilled in the art will appreciate that the present disclosure may be used with many modifications of form, structure, arrangement, proportions, materials, elements, and components and otherwise, used in the practice of the disclosure, which are particularly adapted to specific environments and operative requirements without departing from the principles of the present disclosure. The presently disclosed embodiments are therefore to be considered in all respects as illustrative and not restrictive, the scope of the present disclosure being indicated by the appended claims and their legal equivalents, and not limited to the foregoing description.

What is claimed is:

1. An apparatus comprising:
an optical detecting signal generator configured to provide, through an output port of the optical detecting signal generator, an optical spectrum comprising two frequency carriers, the two frequency carriers having two different nominal carrier frequencies, and the output port of the optical detecting signal generator being further configured to be coupled to a device under test (DUT);
an optical to electrical converter configured to:
generate a first electrical current based on the optical spectrum without the optical spectrum passing through the DUT; and
generate a second electrical current based on the optical spectrum after the optical spectrum passes through the DUT; and
a data processor coupled to the optical to electrical converter, the data processor being configured to determine a transfer function of the DUT at an average of the two different nominal carrier frequencies based on the first electrical current and the second electrical current, wherein the transfer function of the DUT at the average of the two different nominal carrier frequencies is expressed by:

$$\left| H_{DUT}\left(\frac{\omega_{(o,1)} + \omega_{(o,2)}}{2}\right) \right| = \sqrt{\frac{|i(\omega_{(o,2)} - \omega_{(o,1)})|}{|i_{SYS}(\omega_{(o,2)} - \omega_{(o,1)})|}},$$

wherein $$\left| H_{DUT}\left(\frac{\omega_{(o,1)} + \omega_{(o,2)}}{2}\right) \right|$$

is an amplitude of the transfer function of the DUT at the average of the two different nominal carrier frequencies, denoted by $\omega(o,1)$ and $\omega(o,2)$, respectively,
wherein $i_{SYS}(\omega(o,2) - \omega(o,1))$ is the first electrical current, and $i(\omega(o,2) - \omega(o,1))$ is the second electrical current, and
wherein $|i_{SYS}(\omega(o,2) - \omega(o,1))|$ is an amplitude of the first electrical current, and $|i(\omega(o,2) - \omega(o,1))|$ is an amplitude of the second electrical current.

2. The apparatus of claim 1, wherein the optical spectrum comprises one or more additional frequency carriers in addition to the two frequency carriers, and any pair of frequency carriers, except the two frequency carriers, selected from a group consisting of the one or more additional frequency carriers and the two frequency carriers has a spacing in frequency greater than a difference between the two different nominal carrier frequencies.

3. The apparatus of claim 1, wherein both the first electrical current and the second electrical current have a single nominal carrier frequency equal to a difference between the two different nominal carrier frequencies.

4. The apparatus of claim 3, further comprising a signal extractor coupled to the optical to electrical converter and the data processor, the signal extractor being configured to:
receive, through an input port of the signal extractor, an electrical current from the optical to electrical converter;
extract an amplitude and a phase of the electrical current; and
provide, through an output port of the signal extractor, the amplitude and the phase of the electrical current to the data processor, wherein the electrical current is either the first electrical current or the second electrical current.

5. The apparatus of claim 4, wherein the transfer function of the DUT at the average of the two different nominal carrier frequencies is further determined by:

$$D_{DUT}\left(\frac{\omega_{(o,1)} + \omega_{(o,2)}}{2}\right) = \frac{e^{j\{\phi[i(\omega_{(o,2)} - \omega_{(o,1)})] - \phi[i_{SYS}(\omega_{(o,2)} - \omega_{(o,1)})]\}}}{(\omega_{(o,2)} - \omega_{(o,1)})},$$

wherein $$D_{DUT}\left(\frac{\omega_{(o,1)} + \omega_{(o,2)}}{2}\right)$$

is a group delay of the DUT at the average of the two different nominal carrier frequencies, denoted by $\omega(o,1)$ and $\omega(o,2)$, respectively, and
wherein $\phi[i_{SYS}(\omega(o,2) - \omega(o,1))]$ is a phase of the first electrical current, and $\phi[i(\omega(o,2) - \omega(o,1))]$ is a phase of the second electrical current.

6. The apparatus of claim 5, wherein the optical detecting signal generator comprises:
a radiation generator configured to emit, through an output port of the radiation generator, a radiation having a nominal wavelength; and
an optical modulator coupled to the radiation generator, the optical modulator being configured to:

receive, through a first input port of the optical modulator, the radiation from the radiation generator;

receive, through a second input port of the optical modulator, a first radio-frequency (RF) signal having a first RF frequency, and a second RF signal having a second RF frequency, the first RF frequency being different than the second RF frequency;

generate the optical spectrum by modulating the radiation based on the first RF signal and the second RF signal; and output, through an output port of the optical modulator, the optical spectrum.

7. The apparatus of claim 6, wherein the radiation generator comprises:

a comb source configured to provide an optical frequency comb having a plurality of equally spaced optical frequency carriers; and a tunable optical filter coupled to the comb source, the tunable optical filter being configured to output one frequency carrier, controllable by the data processor, of the optical frequency comb.

8. The apparatus of claim 5, wherein the optical detecting signal generator comprises:

a mode-locked laser; and a tunable optical filter coupled to the mode-locked laser, wherein the tunable optical filter is configured to output two optical frequency carriers, controllable by the data processor, of a radiation provided by the mode-locked laser.

9. A method comprising:

providing an optical spectrum comprising two frequency carriers, the two frequency carriers having two different nominal carrier frequencies;

generating a first electrical current based on the optical spectrum without the optical spectrum passing through a device under test (DUT);

generating a second electrical current based on the optical spectrum after the optical spectrum passes through the DUT; and determining, by a data processor, a transfer function of the DUT at an average of the two different nominal carrier frequencies based on the first electrical current and the second electrical current, wherein the transfer function of the DUT at the average of the two different nominal carrier frequencies is expressed by:

$$\left| H_{DUT}\left(\frac{\omega_{(o,1)} + \omega_{(o,2)}}{2}\right) \right| = \sqrt{\frac{|i(\omega_{(o,2)} - \omega_{(o,1)})|}{|i_{SYS}(\omega_{(o,2)} - \omega_{(o,1)})|}},$$

wherein $$\left| H_{DUT}\left(\frac{\omega_{(o,1)} + \omega_{(o,2)}}{2}\right) \right|$$

is an amplitude of the transfer function of the DUT at the average of the two different nominal carrier frequencies, denoted by $\omega(o,1)$ and $\omega(o,2)$, respectively, wherein $i_{SYS}(\omega(o,2)-\omega(o,1))$ is the first electrical current, and $i(\omega(o,2)-\omega(o,1))$ is the second electrical current, and wherein $|i_{SYS}(\omega(o,2)-\omega(o,1))|$ is an amplitude of the first electrical current, and $|i(\omega(o,2)-\omega(o,1))|$ is an amplitude of the second electrical current.

10. The method of claim 9, wherein the optical spectrum comprises one or more additional frequency carriers in addition to the two frequency carriers, and any pair of frequency carriers, except the two frequency carriers, selected from a group consisting of the one or more additional frequency carriers and the two frequency carriers has a spacing in frequency greater than a difference between the two different nominal carrier frequencies.

11. The method of claim 9, wherein both the first electrical current and the second electrical current have a single nominal carrier frequency equal to a difference between the two different nominal carrier frequencies.

12. The method of claim 11, further comprising:

receiving an electrical current;

extracting an amplitude and a phase of the electrical current; and providing the amplitude and the phase of the electrical current to the data processor, wherein the electrical current is either the first electrical current or the second electrical current.

13. The method of claim 12, wherein the transfer function of the DUT at the average of the two different nominal carrier frequencies is further determined by:

$$D_{DUT}\left(\frac{\omega_{(o,1)} + \omega_{(o,2)}}{2}\right) = \frac{e^{j\{\phi[i(\omega_{(o,2)}-\omega_{(o,1)})]-\phi[i_{SYS}(\omega_{(o,2)}-\omega_{(o,1)})]\}}}{(\omega_{(o,2)} - \omega_{(o,1)})},$$

wherein $$D_{DUT}\left(\frac{\omega_{(o,1)} + \omega_{(o,2)}}{2}\right)$$

is a group delay of the DUT at the average of the two different nominal carrier frequencies, denoted by $\omega(o,1)$ and $\omega(o,2)$, respectively, and wherein $\phi[i_{SYS}(\omega(o,2)-\omega(o,1))]$ is a phase of the first electrical current, and $\phi[i(\omega(o,2)-\omega(o,1))]$ is a phase of the second electrical current.

14. The method of claim 13, wherein the optical spectrum is provided by:

receiving a first radio-frequency (RF) signal having a first RF frequency, and a second RF signal having a second RF frequency, the first RF frequency being different than the second RF frequency;

generating the optical spectrum by modulating a radiation having a nominal wavelength based on the first RF signal and the second RF signal; and outputting the optical spectrum.

15. The method of claim 14, further comprising generating the radiation, wherein the radiation is generated by:

providing an optical frequency comb having a plurality of equally spaced optical frequency carriers; and outputting one frequency carrier of the optical frequency comb.

16. An apparatus comprising:

an optical multiple-carrier generator configured to provide, through an output port of the optical multiple-carrier generator, an optical spectrum having a plurality of optical frequency carriers, wherein the output port of the optical multiple-carrier generator is further configured to be coupled to a device under test (DUT);

a splitter configured to:

receive, through an input port of the splitter, the optical spectrum; and provide each of a plurality of portions of the optical spectrum to a respective one of a plurality of channels;

the plurality of channels coupled to the splitter, wherein each of the plurality of channels comprises an optical to electrical converter, the optical to electrical converter being configured to:

receive a respective portion of the optical spectrum, the respective portion of the optical spectrum comprising two frequency carriers, and the two frequency carriers having two different nominal carrier frequencies;

generate a first electrical current based on the respective portion of the optical spectrum without the optical spectrum passing through the DUT; and generate a second electrical current based on the respective portion of the optical spectrum after the optical spectrum passes through the DUT; and a data processor coupled to the plurality of channels, wherein the data processor is configured to determine, with respect to each of the plurality of channels, a transfer function of the DUT at an average of the two different nominal carrier frequencies based on the first electrical current and the second electrical current, wherein the transfer function of the DUT at the average of the two different nominal carrier frequencies is expressed by:

$$\left|H_{DUT}\left(\frac{\omega_{(o,1)} + \omega_{(o,2)}}{2}\right)\right| = \sqrt{\frac{|i(\omega_{(o,2)} - \omega_{(o,1)})|}{|i_{SYS}(\omega_{(o,2)} - \omega_{(o,1)})|}},$$

wherein $$\left|H_{DUT}\left(\frac{\omega_{(o,1)} + \omega_{(o,2)}}{2}\right)\right|$$

is an amplitude of the transfer function of the DUT at the average of the two different nominal carrier frequencies, denoted by $\omega(o,1)$ and $\omega(o,2)$, respectively, wherein $i_{SYS}(\omega(o,2)-\omega(o,1))$ is the first electrical current, and $i(\omega(o,2)-\omega(o,1))$ is the second electrical current, and wherein $|i_{SYS}(\omega(o,2)-\omega(o,1))|$ is an amplitude of the first electrical current, and $|i(\omega(o,2)-\omega(o,1))|$ is an amplitude of the second electrical current.

17. The apparatus of claim 16, wherein both the first electrical current and the second electrical current have a single nominal carrier frequency equal to a difference between the two different nominal carrier frequencies.

18. The apparatus of claim 17, wherein each of the plurality of channels further comprises a signal extractor coupled to the optical to electrical converter, the signal extractor being configured to:

receive, through an input port of the signal extractor, an electrical current from the optical to electrical converter;

extract an amplitude and a phase of the electrical current; and provide, through an output port of the signal extractor, the amplitude and the phase of the electrical current to the data processor, wherein the electrical current is either the first electrical current or the second electrical current.

19. The apparatus of claim 18, wherein the transfer function of the DUT at the average of the two different nominal carrier frequencies is further determined by:

$$D_{DUT}\left(\frac{\omega_{(o,1)} + \omega_{(o,2)}}{2}\right) = \frac{e^{j\{\phi[i(\omega_{(o,2)} - \omega_{(o,1)})] - \phi[i_{SYS}(\omega_{(o,2)} - \omega_{(o,1)})]\}}}{(\omega_{(o,2)} - \omega_{(o,1)})},$$

wherein $$D_{DUT}\left(\frac{\omega_{(o,1)} + \omega_{(o,2)}}{2}\right)$$

is a group delay of the DUT at the average of the two different nominal carrier frequencies, denoted by $\omega(o,1)$ and $\omega(o,2)$, respectively, and wherein $\phi[i_{SYS}(\omega(o,2)-\omega(o,1))]$ is a phase of the first electrical current, and $\phi[i(\omega(o,2)-\omega(o,1))]$ is a phase of the second electrical current.

20. The apparatus of claim 19, wherein the optical multiple-carrier generator comprises:

a plurality of laser sources configured to emit a plurality of radiations, each of the plurality of radiations having a different nominal wavelength; and a multiplexer coupled to the plurality of laser sources, wherein the multiplexer is configured to provide a combined radiation by combining the plurality of radiations.

* * * * *